United States Patent [19]
Ashmun et al.

[11] Patent Number: 5,281,958
[45] Date of Patent: Jan. 25, 1994

[54] POINTING DEVICE WITH ADJUSTABLE CLAMP ATTACHABLE TO A KEYBOARD

[75] Inventors: Stuart Ashmun, Seattle; Charlie Garthwaite, Kirkland; Bridget Cameron, Seattle; Allan H. Stephan, Seattle; Michael D. Nelson, Seattle; Mike M. Paull, Seattle, all of Wash.; Paul Bradley; James R. Yurchenco, both of Santa Clara County, Calif.; Elinor J. Fulton, Contra Costa County, Calif.

[73] Assignee: Microsoft Corporation, Redmond, Wash.

[21] Appl. No.: 731,626

[22] Filed: Jul. 17, 1991

Related U.S. Application Data

[63] Continuation-in-part of Ser. No. 598,562, Oct. 22, 1990, abandoned, which is a continuation-in-part of Ser. No. 425,527, Oct. 23, 1989, Pat. No. 5,187,468.

[51] Int. Cl.$^5$ .............................................. G09G 3/02
[52] U.S. Cl. ................................... 345/157; 345/164; 345/169
[58] Field of Search .............. 340/709, 710, 711, 706; 341/20, 22, 35; 400/717; D14/114

[56] References Cited

U.S. PATENT DOCUMENTS

| D. 300,324 | 3/1989 | Akagi et al. ........................ D14/100 |
| 3,395,589 | 8/1968 | Gersten . |
| 3,541,541 | 11/1970 | Engelbart . |
| 3,625,083 | 12/1971 | Bose . |
| 3,835,464 | 9/1974 | Rider . |
| 3,987,685 | 10/1976 | Opocensky . |

(List continued on next page.)

FOREIGN PATENT DOCUMENTS

| 1526428 | 10/1975 | United Kingdom . |
| 59-186035 | 10/1984 | Japan . |
| 2154306A | 9/1985 | United Kingdom . |

OTHER PUBLICATIONS

PC-TRAC Trackball by Microspeed; operating model Package bearing copyright date of 1990.
FastTrap Trackball by Microspeed; operating model Package bearing copyright date of 1987.
Honeywell Lynx Trackball Model No. LX200-192-E, bearing internal copyright date of 1985.
"The MacIntosh Portable Special Preview" MacWorld Nov., 1989.
IBM Technical Disclosure "Mouse/Keyboard Concept Incorporating Unique Devices for Controlling CRT Display Cursors" vol. 27, No. 10B, pp. 6299–6305, Mar. 1985.

Primary Examiner—Ulysses Weldon
Attorney, Agent, or Firm—Seed and Berry

[57] ABSTRACT

A pointing device which is removably attachable to a keyboard is disclosed. The pointing device is coupled to an attachment assembly, the attachment assembly being removably and selectively attachable to the keyboard. The attachment assembly includes a coupling assembly and a tilting assembly. The full weight of the pointing device is supported by the computer so that a work surface is not necessary. In one embodiment, a clamping assembly is provided. The clamp assembly includes a variable width clamp to permit the pointing device to be attached to any one of a number of different keyboards or in different positions on the same keyboard. The tilting assembly permits the user to select whether the pointing device is in a horizontal, vertical or other orientation. A rotatable ball of the pointing device is retained in contact with the rotation sensing encoders regardless of the orientation of the housing. The buttons for activating switches to enter commands into the computer overlap a top portion and a side portion of the pointing device.

16 Claims, 29 Drawing Sheets

U.S. PATENT DOCUMENTS

| | | | |
|---|---|---|---|
| 4,245,244 | 1/1981 | Lijewski et al. | |
| 4,310,839 | 1/1982 | Schwerdt | |
| 4,369,439 | 1/1983 | Broos | |
| 4,404,865 | 9/1983 | Kim | |
| 4,464,652 | 8/1984 | Lapson et al. | |
| 4,533,830 | 8/1985 | Beauprey | |
| 4,538,476 | 9/1985 | Luque | 340/710 X |
| 4,543,571 | 9/1985 | Bilbrey et al. | 340/710 |
| 4,559,532 | 12/1985 | Hosogoe | |
| 4,562,314 | 12/1985 | Hosogoe et al. | |
| 4,562,347 | 12/1985 | Hovey et al. | |
| 4,573,925 | 3/1986 | Styers | |
| 4,581,609 | 4/1986 | Hosogoe et al. | |
| 4,594,586 | 6/1986 | Hosogoe | |
| 4,595,070 | 6/1986 | Hodges | |
| 4,612,539 | 9/1986 | Hosogoe et al. | |
| 4,613,853 | 9/1986 | Hosogoe et al. | |
| 4,635,496 | 1/1987 | McTyre | |
| 4,652,871 | 3/1987 | Tsukada et al. | |
| 4,670,743 | 6/1987 | Zemke | |
| 4,686,522 | 8/1987 | Hernandez et al. | |
| 4,698,626 | 10/1987 | Sato et al. | 340/710 |
| 4,734,685 | 3/1988 | Watanabe | |
| 4,736,191 | 4/1988 | Matzke et al. | 340/710 X |
| 4,739,315 | 4/1988 | Soma et al. | |
| 4,786,768 | 11/1988 | Langewis et al. | |
| 4,786,892 | 11/1988 | Kubo et al. | |
| 4,797,665 | 1/1989 | Ida et al. | |
| 4,799,049 | 1/1989 | Avila | |
| 4,801,931 | 1/1989 | Schmidt | |
| 4,818,851 | 4/1989 | Kimura | |
| 4,823,634 | 4/1989 | Culver | 340/706 |
| 4,886,941 | 12/1989 | Davis et al. | 340/710 X |
| 4,913,387 | 4/1990 | Tice | |
| 5,008,528 | 4/1991 | Duchon | |

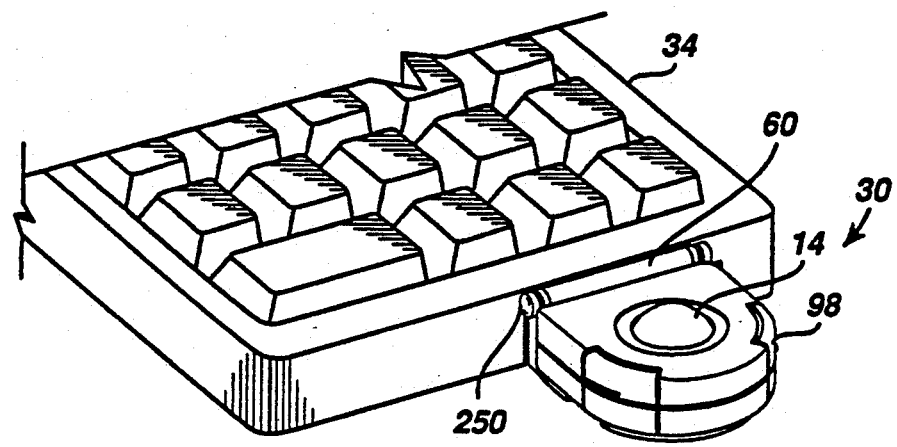
Figure 51
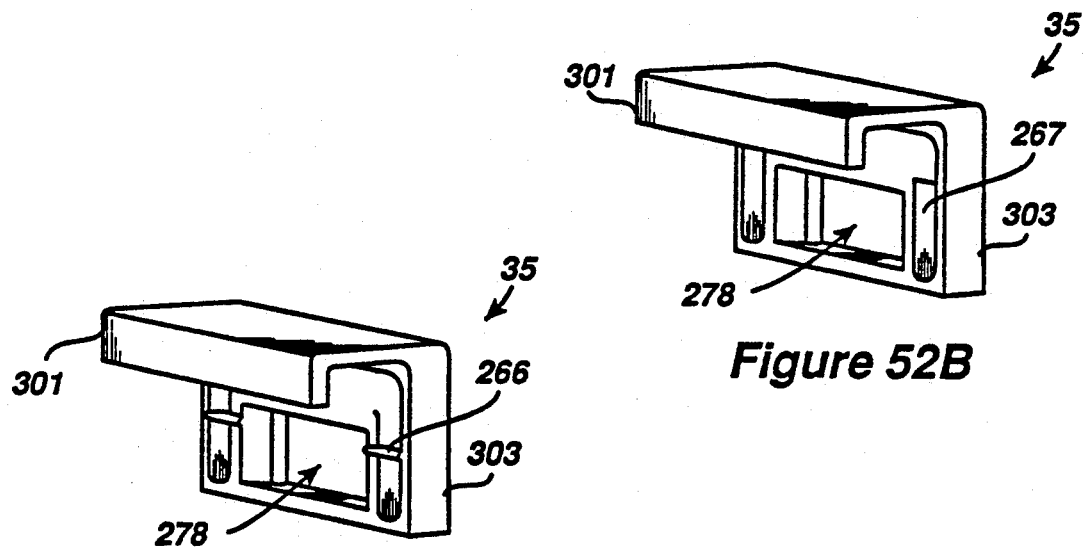
Figure 52A
Figure 52B

POINTING DEVICE WITH ADJUSTABLE CLAMP ATTACHABLE TO A KEYBOARD

CROSS-REFERENCE TO RELATED APPLICATION

This application is a continuation-in-part, of Ser. No. 07/598,562, filed Oct. 22, 1990, which now abandoned is a continuation-in-part of Ser. No. 07/425,527, filed Oct. 23, 1989, now U.S. Pat. No. 5,187,468.

TECHNICAL FIELD

This invention is related to a pointing device for entering commands into a computer, and more particularly, to a track ball which is removably attachable to a laptop, portable or desk top computer.

BACKGROUND OF THE INVENTION

Pointing devices for entering commands into a computer, such as mouses, joy sticks, x-y tablets, wire pens and track balls, are well known in the art. Some pointing devices include a rotatable ball and one or more depressible buttons. Electronic encoders sense rotation of the ball and generate a signal indicative of the ball's rotation to control movement of a cursor on the screen of the computer. A joy stick-type pointing device moves a cursor based on the position of the joy stick. Other pointing devices similarly enter commands into a computer. Depressing the button, whether on a mouse, joy stick or track ball, permits the user to enter various commands into the computer, based on the location of the cursor. For example, depressing the button may pull down a menu; create starting, ending, or other points in a graphic pattern on the screen; move objects to different locations on the screen; and the like.

Pointing devices having a rotatable ball are generally grouped into two categories, a mouse type or a track ball type. In a mouse-type device, the ball extends from the bottom of a housing for contacting a table top or other work surface. Movement of the housing across the table top causes rotation of the ball and the appropriate movements of the cursor on the screen. FIG. 1 of U.S. Pat. No. 4,612,539, to Hosogoe et al., illustrates a prior art mouse-type device. In a track ball-type pointing device, the rotatable ball faces upward in a housing positioned on a table top. The rotatable ball is exposed above the housing for rotation by the hand of a user. The housing may include one or more depressible buttons to enter commands into the computer, based on the position of the cursor on the screen. U.S. Pat. No. 4,786,892, to Kubo et al., is an example of a pointing device which is alternatively usable as a mouse or track ball-type device.

Prior art pointing devices, particularly a mouse or a track ball type, are not easily usable with laptop or portable computers. Pointing devices having a ball often require a work surface against which to roll the ball or upon which the housing of the track ball must sit. A laptop computer is often used in an environment where a work surface is not provided. For example, laptop or portable computers may be used on an airplane or while sitting in a chair with no desk or in a chair spaced from a desk. Other computers, such as portable computers and the standard personal computer, may be used in an environment which does not provide a work surface to facilitate operation of the pointing device.

SUMMARY OF THE INVENTION

It is therefore an object of this invention to provide a pointing device which is operable in an environment without a work surface.

It is another object of this invention to provide a pointing device which is attachable to a computer to provide a support surface for the pointing device.

It is another object of this invention to provide a pointing device whose orientation with respect to the computer, whether vertical, horizontal, or other orientation, is variable and selectable by a user.

It is another object of this invention to provide a coupling between a pointing device and a computer which permits easy separation between a computer and a pointing device.

It is another object of this invention to protect a pointing device and the computer to which it is attached from being damaged by excessive force applied to the pointing device.

It is a further object of this invention to provide a plurality of buttons as part of the pointing device to permit the user to select which of the buttons will be operational for inputting selected commands into the computer.

These and other objects of the invention, as will be apparent herein, are accomplished by providing a pointing device having an attachment assembly for removably attaching the pointing device to a computer. A work surface for the pointing device is not required because the computer supports the full weight of the pointing device and positions it properly. The attachment assembly includes a coupling assembly and a tilting assembly. In addition, a clamping assembly may be included in the attachment assembly.

The pointing device is attachable to any part of the computer, such as the screen, the keyboard or some other part of the computer. The coupling assembly facilitates coupling of the pointing device to the computer. The coupling assembly is directly attachable to the computer. A computer may include a recess for mating with the coupling assembly. Alternatively, the coupling device may be coupled to the clamping assembly, and the clamping assembly directly attachable to a computer which does not include a recess. The clamping assembly includes a variable width clamp to permit attachment to any one of a number of different keyboards. Further, the user may select whether to attach the clamp member to the right side, front, left side, or any other position on the keyboard or computer. The tilting assembly facilitates varying the orientation of the pointing device with respect to the computer. The tilting assembly is connected to the coupling assembly and the pointing device is attachable to the tilting assembly. The coupling of the tilting assembly to the clamping assembly includes a pivot. The user selects whether the pointing device is in a horizontal, vertical, or other orientation.

To prevent damage to the pointing device or the computer to which it is attached, it can separate from the computer if excessive force is applied. The coupling assembly includes a pair of gripping members for mating with a slot in the computer or in the clamping assembly. The gripping members are resiliently biased into gripping contact with a flange in the walls of the slot. The gripping members include an arcuate protrusion and an arcuate top and bottom to permit them to separate smoothly from the retaining member if the spring force is overcome.

The rotatable ball of the pointing device is retained in contact with the rotation-sensing encoders regardless of the orientation of the housing. A lower ball retainer is in contact with the ball at a point below the center line of the ball. An upper ball retainer is in contact with the ball at a point above the center line of the ball. The position of the two retainers ensures that ball rotation is uniformly sensed whether the track ball is in a horizontal, vertical, or any other orientation.

In one embodiment, the buttons overlap the top and side of the pointing device. Pressing down on the top of the button or inward on the side of the button activates the switches for entering commands into the computer. The pointing device includes four buttons which are selectively enabled by the user for inputting commands into the computer.

BRIEF DESCRIPTION OF THE DRAWINGS

FIG. 51 is an isometric view of an alternative embodiment for coupling a pointing device to a computer.

FIG. 52A is an isometric view of an alternative embodiment of a clamping assembly.

FIG. 52B is an isometric view of an alternative embodiment of the clamping assembly of FIG. 52A.

DETAILED DESCRIPTION OF THE INVENTION

Figure 1:
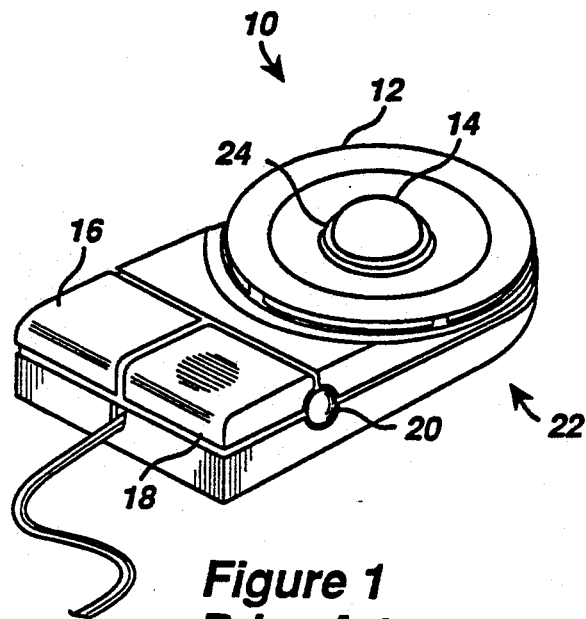
FIG. 1 is an isometric view of a prior art pointing device.
Figure 20:
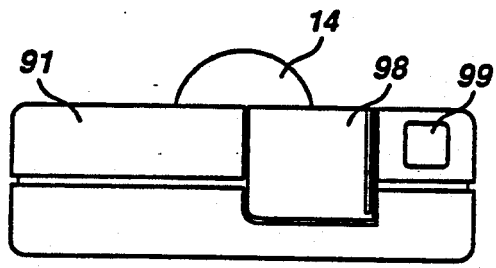
FIG. 20 is a side elevational view of FIG. 19.

FIG. 1 illustrates a prior art pointing device for entering commands into a computer (not shown). The device of FIG. 1 is similar in structure and operation to the device illustrated and described in U.S. Pat. No. 4,786,892, to Kubo et al. (the '892 patent). The prior art pointing device 10 includes a ball 14 and buttons 16, 18 and 20 within a housing 12. As illustrated in FIG. 20 of the '892 patent, the ball 14 may extend out of the bottom of the housing to operate the pointing device 10 as a mouse-type device. Alternatively, the ball 14 may extend out of the top of the housing to operate the pointing device 10 as a track ball-type device. (See FIGS. 21 and 22 and column 8 of the '892 patent.) A bottom surface 22 remains in contact with the upper surface of a work table whether the pointing device 10 is in the mouse or a track ball mode.

As shown in FIG. 1, the buttons 16 and 18 overlap both the top and the side of the housing 12. However, the buttons 16 and 18 activate microswitches in the housing only if depressed downward from the top. That is, pressing on the switches 16 or 18 from the side inward or from the front inward does not activate the microswitches below the buttons and does not send a control signal to the computer. Similarly, pulling on any portion of the buttons 16 and 18 does not activate the respective microswitches within the housing 12. The user is required to depress the buttons downward from the top to activate the microswitches. Depressing the button 20 from the side inward causes activation of the microswitch associated with button 20 within the housing 12. Depressing button 20 from the top downward or pulling on the button 20 does not activate the microswitch in the housing.

The prior art of FIG. 1 has numerous disadvantages. Namely, a work surface is required for the pointing device 10. In addition, the user must press on the buttons 16, 18 and 20 in a specific direction to ensure activation of the microswitches and the inputting of commands into the computer. Because of the structural relationship between the ball 14 and the switches 16, 18, and 20 and the design of housing 12, the user's hand must be oriented in a prescribed position on the pointing device 10 for operation.

FIGS. 2–5 illustrate a pointing device 30 and attachment assembly 32 according to the invention. The pointing device 30 is removably attached to computer 34 via the attachment assembly 32. The entire weight of the pointing device and attachment assembly are supported by the computer. A work surface area to support the pointing device is not required because the computer 34 provides the support for the pointing device and retains it in a position for use by a user.

The term computer is used herein in its broadest sense to refer to any portion of a computer or peripheral device. For example, the term computer is broad enough to include the keyboard for coupling to the housing holding the main CPU and display monitor, which is adapted to be coupled to a computer, a laptop computer or the like. The attaching assembly is configured to permit the pointing device to be coupled to any of these components included in a computer.

Figure 2:
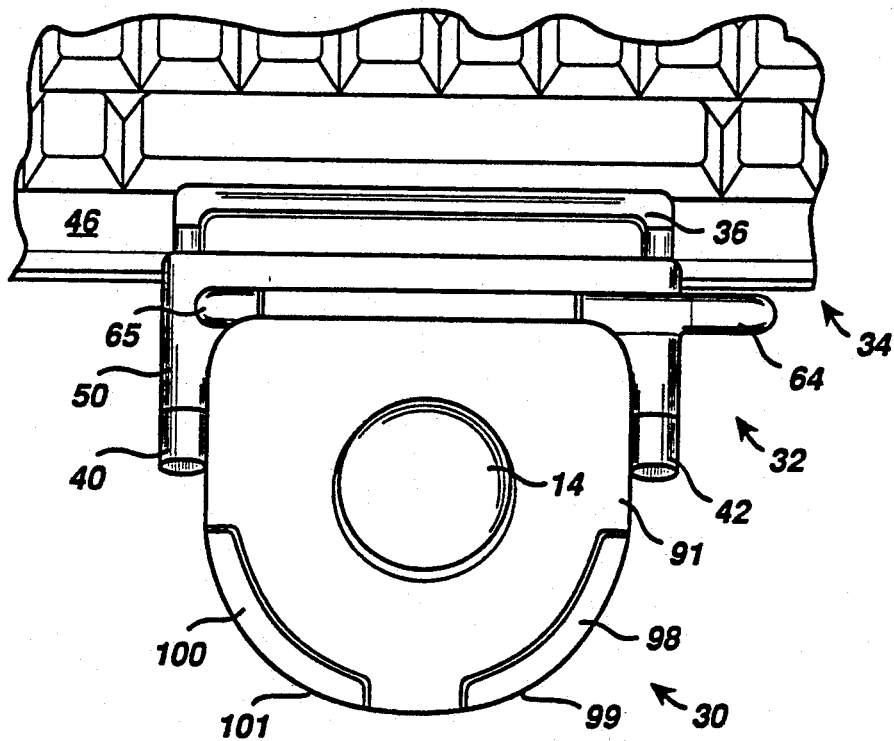
FIG. 2 is a top isometric view of the inventive pointing device and attachment assembly coupled to the front of a keyboard of a computer.
Figure 3:
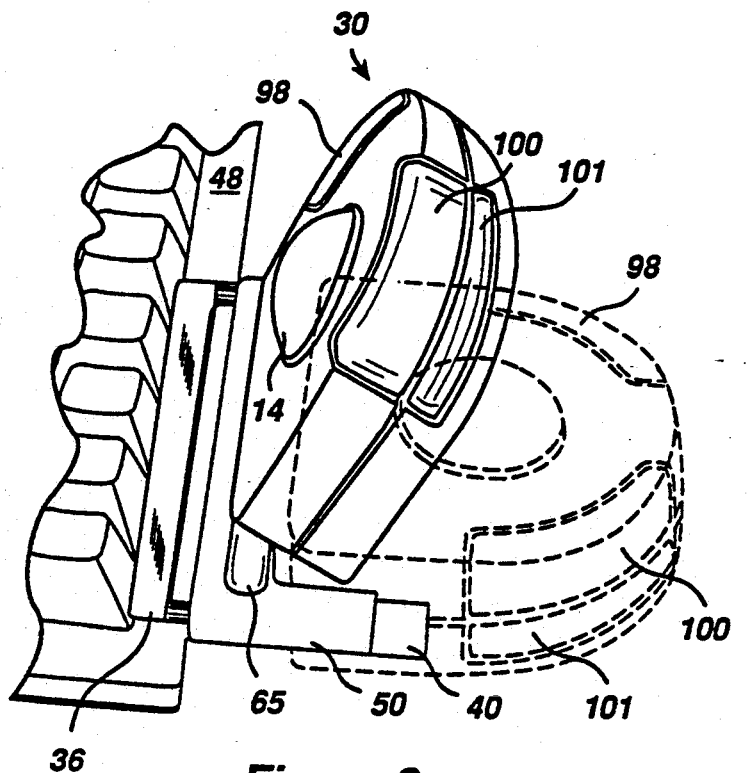
FIG. 3 is a front isometric view of the inventive pointing device attached to the side of a keyboard positioned alternatively in generally a vertical or a horizontal orientation.
Figure 4B:
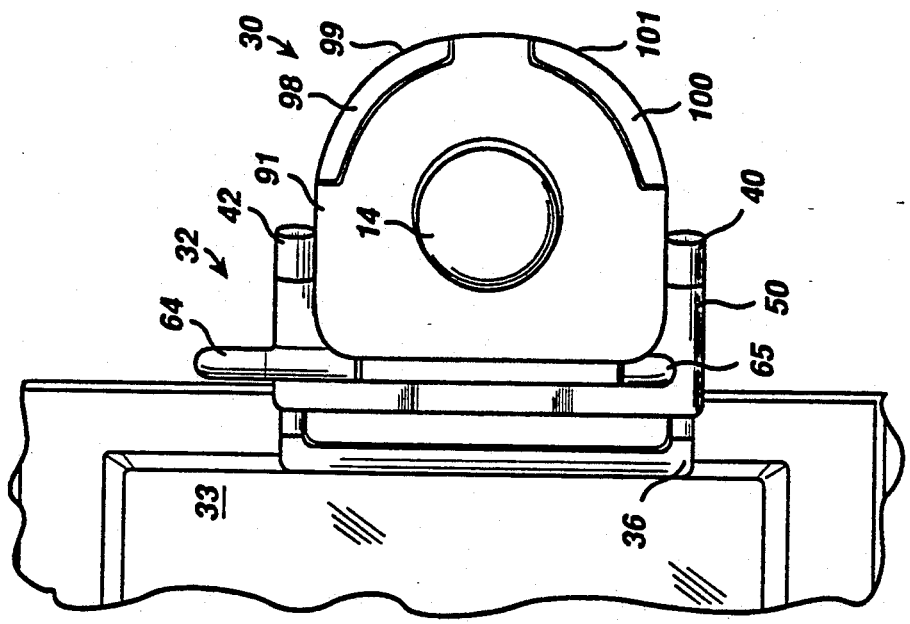
FIG. 4b is an isometric view of the attachment assembly coupled to the screen of a computer.
Figure 4A:
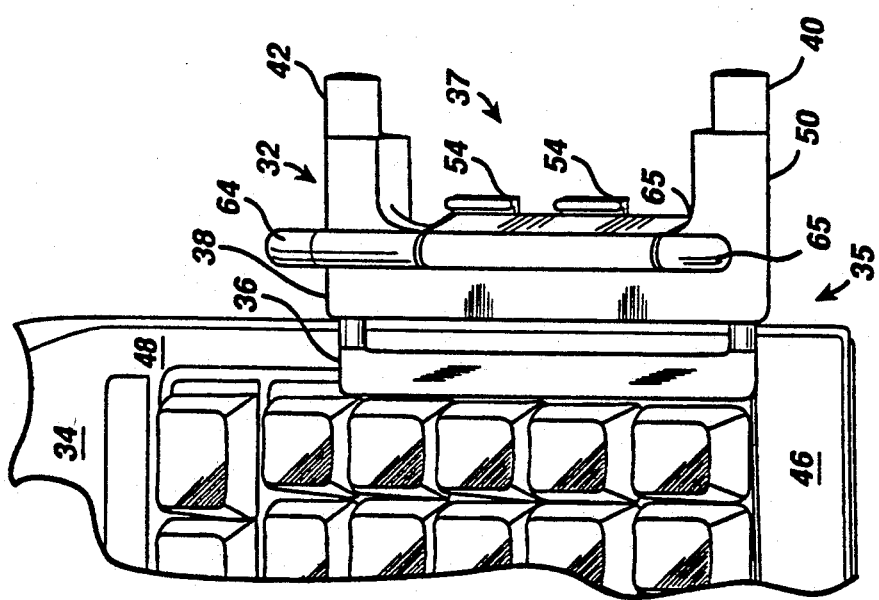
FIG. 4a is a top isometric view of the attachment assembly coupled to the side of the keyboard.
Figure 6:
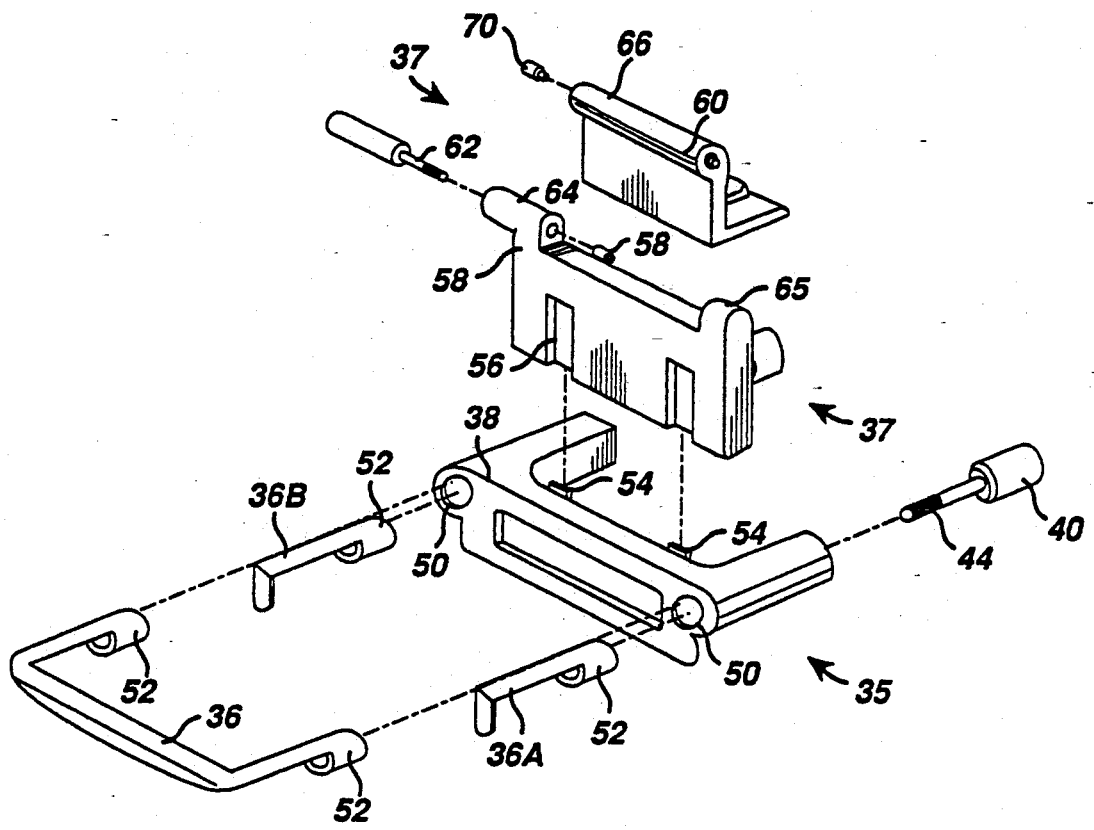
FIG. 6 is an exploded isometric view of the attachment assembly.

As illustrated in FIGS. 4a and 6, the attachment assembly 32 includes a clamping assembly 35 and a tilting assembly 37. The clamping assembly 35 includes a clamp bar 36 and a support member 38. The clamp bar 36 may be a unitary, single-blade member extending from threaded member 40 to threaded member 42. Alternatively, the clamp may be a dual-blade type, having separate clamp members 36A and 36B coupled to threaded members 40 and 42, respectively. The clamp members 36A and 36B may be of any desired length. For some keyboards, long clamp members may be required. In some environments, the clamp members 36A and 36B are different lengths from each other, to facilitate coupling to a selected location. Support member 38 includes channels 50 through which the shanks 44 extend for mating with respective threaded portions 52 of clamp member 36. Rotation of threaded members 40 and 42 draws the clamp member 36 toward the support member 38 for clamping a member between them. The shaft 44 of threaded members 40 and 42 has a length sufficient to permit the clamping member 36 and support member 38 to clamp over objects of many different widths. As illustrated in FIG. 2, the attachment assembly 32 is clamped to a front member 46 adjacent the space bar of the computer 34. As illustrated in FIGS. 3, 4a, and 4b, the attachment assembly 32 is clamped to a right side member 48 of the computer 34. Similarly, the clamp member 32 may be coupled to the left side of the computer 34 or at a top edge opposite the front member 46, if desired. The clamp assembly 35 is thus easily attachable by a user to any portion of the computer 34.

The clamping assembly 35 includes docking fixtures 54 for coupling the tilting assembly 37 to the clamp assembly 35. In one embodiment, the docking fixtures 54 are tapered dovetail fixtures and the tilting assembly 37 has mating slots 56 for sliding over the dovetail fixtures 54. Alternatively, the docking fixtures 54 and mating receptacle 56 may be any coupling assembly known in the art. For example, a mounting plate 74 similar to the two types later shown and described for coupling pointing device 30 to the attachment assembly 32 may be used.

The tilting assembly 37 includes a stationary member 58 and a pivoting member 60. The stationary member 58 includes the mating slots 56 for coupling to the clamp assembly 35 in a fixed relationship. A threaded shaft 62 extends through a channel 64 of stationary member 58 and into a channel 66 of tilting member 60. A toothed insert 68 in channel portion 64 mates with a toothed insert 70 in channel 66 of the tilting mechanism for locking the tilting member 60 in a desired position as selected by a user. The channel 66 includes a plunger pivot pin 72 extending into a recess (not shown) in a shoulder 65 of the stationary member 58 for pivotally supporting the tilting member 60. In one embodiment, illustrated in FIGS. 2-5, the support member 38 and stationary member 58 are single, unitary member and are part of the clamping assembly. In this alternative embodiment, the pivoting member 60 is coupled to the clamp assembly 35 by threaded shaft 62. The channel 64, channels 50, and shoulder 65 are part of an integral member with support member 38. This entire portion of the clamp assembly 35 may be formed by injection molding.

To place the pointing device 30 in a generally vertical orientation, as shown in FIG. 3 in solid lines, the user loosens the screw 62, rotates the tilting member 60 upward to the desired orientation, and then tightens the screw 62, locking the pointing device in the desired position. The pointing device 30 may be locked in any selected orientation about pivot 62. The pointing device 30 may be in a generally horizontal orientation, as shown in phantom lines in FIG. 3. Alternatively, it may be locked in a sloped orientation, such as 30 degrees, 45 degrees, 60 degrees, or the like. If desired, the pointing device 30 may be pivoted beyond the vertical to any selected position, even sufficiently far to invert the ball 14 to the underside of the pointing device 30.

In an alternative embodiment, as illustrated in FIGS. 2-5, the pivot shaft 62 extends completely through the channel 66 of tilting member 60 and screws into mating threads in a recess in the shoulder 65 of stationary member 58. The tilting member 60 is held at the selected position by tightening the pivot screw 62, pulling the channel 64 toward the shoulder 65 having the recess therein to clamp the channel 66 in a selected position between the channel 64 and shoulder 65. Other pivoting and locking or clamping mechanisms for permitting the tilting member 60 to pivot with respect to the stationary member 58 may be used, if desired.

Figure 5:
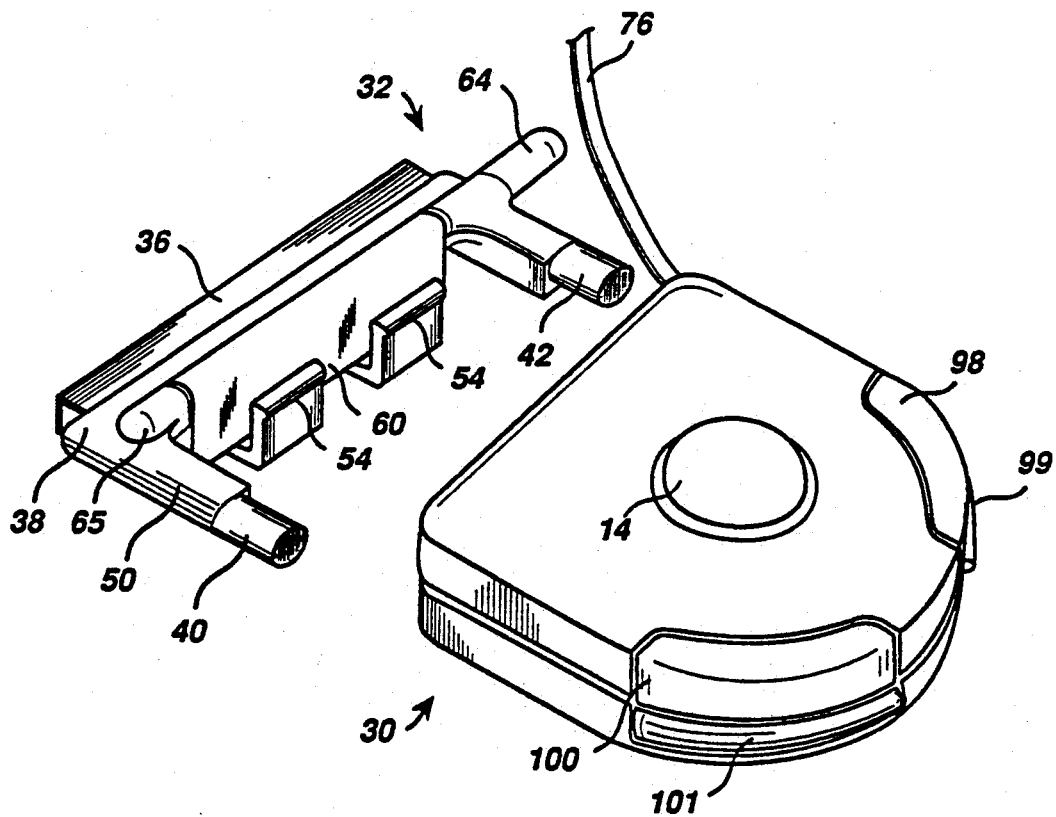
FIG. 5 is a front isometric view of the pointing device and the attachment assembly separated from each other.
Figure 7:
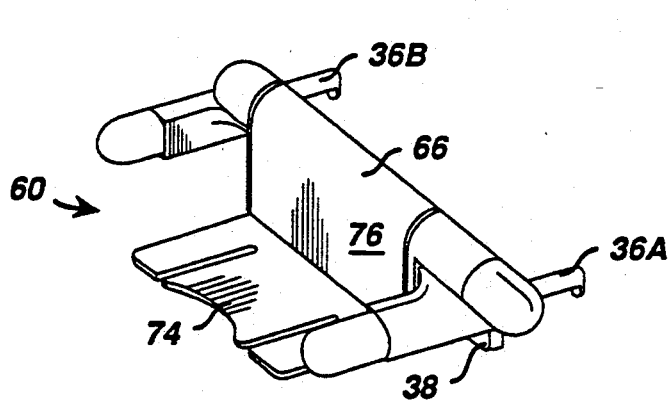
FIG. 7 is an isometric view of the assembled attachment assembly.
Figure 8:
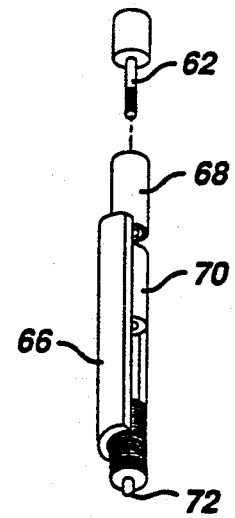
FIG. 8 is an isometric view of a locking member for holding the tilting assembly in a fixed position.

The tilting member 60 includes a mounting plate 74 for retaining the pointing device 30. In the embodiment of FIGS. 6 and 7, the mounting plate 74 extends perpendicular to a wall 76 of tilting member 60. The pointing device 30 includes a mating slot on the underside for sliding over the plate 74 to attach the pointing device 30 to the tilting member 60. The pointing device 30 may be locked in position on the plate 74 with screws, clamps, glue, or the like. FIGS. 4a and 5 illustrate an alternative embodiment of the mounting plate 74. In the alternative embodiment, the mounting plate 74 extends in juxtaposition to the wall 76 of the tilting member 60. The pointing device 30 includes a pair of slots for sliding onto the plate 74, in a mating, coupling relationship. Any suitable coupling, such as a dovetail, tongue-and-groove, or the like, between the pointing device 30 and attachment assembly 35 may be used in place of the two embodiments illustrated herein.

As shown in FIG. 4b, the pointing device 30 is attachable to the display 33 of the computer. When coupled adjacent the display 33, the pointing device 30 is held in a generally vertical orientation. The orientation of the pointing device may be changed by the user, if desired, tilting it inward towards the screen, backwards or the like. In some laptop computers, the keyboard, display and electronics are in a single housing. In other laptop and desktop computers, the keyboard and display are coupled to the housing of the CPU by electric cords. In each design, the keyboard, display and the like are thus considered part of the computer. For a network or main frame environment, a personal computer or terminal coupled to the network, the keyboard 34, display 35 and other peripherals are also considered elements of the computer for purposes of this invention. The pointing device 30 may be attached, via the clamping assembly 35, to the arm of a chair, a telephone, a drawer, a shirt pocket or belt of a user, or any other object to provide convenient operation by a user.

This invention is especially useful for a portable computer, permitting use of a pointing device when a work surface is not available, such as when the computer is supported on a user's lap. The full weight of the pointing device and attaching assembly is borne by the computer. The pointing device extends laterally from the computer and a work surface to support the pointing device is not required.

The pointing device thus does not take up keyboard space or increase the defined footprint or height of a computer, all valuable commodities in a portable computer. Having the pointing device extend from a user's selected position, usually laterally, from the computer and yet be removable effectively provides a laptop computer with an extended keyboard or working surface while in operation, but permits the size to be compacted by removing the pointing device. The user is able to determine, at least in part, the space taken up by the computer by placement of the pointing device 30. If using the computer on the window seat of an airplane, the user may place the pointing device on top of the screen or left-hand side because the right-hand side is not available. Further, the computer may be configured by the user for a left-handed or right-handed person. A user may thus be provided with a keyboard having all of the standard features, including a number keypad and a conveniently located pointing device. Also, advantageously, the pointing device may be alternatively coupled to or removed from the computer easily by the user as often as desired. When transporting a portable computer, the user may stow the pointing device and attaching assembly in the bag or other location. When using the computer, the user may couple the pointing device, via the attaching assembly, to any location on the computer. When next transporting the computer, the pointing device may be removed.

Once coupled, the pointing device is connected in a fixed location, when attached to the computer. The connection is a mechanical coupling which holds the pointing device to the computer. Of course, the orientation of the pointing device may change while fixed in one location. In some embodiments, the attaching assembly provides a purely mechanical coupling—no electrical connections are made between the computer and pointing device by the attaching assembly. Rather, a separate electrical cable 76 couples the pointing device to the computer and does not provide mechanical support. In other embodiments, the electrical connection is part of the attaching assembly and provides some mechanical support, as well as electrical connection (see FIG. 45).

In an alternative embodiment, the pointing device 30 or the tilting assembly 37 are coupled to the side of a keyboard, computer screen, or the like, with other attachment means. An elastomeric snap assembly having one member coupled to the keyboard by an adhesive and the other member sliding into it may be used. Alternatively, a Velcro TM strip may be glued to the keyboard and a cloth surface for removably attaching to the Velcro TM strip coupled to the pointing device 30 or vice versa. The pointing device 30 or tilting assembly 37 may be coupled with magic tape, an adhesive or other clamping means, to the computer 34 or other part of the computer, if desired.

Figure 9:
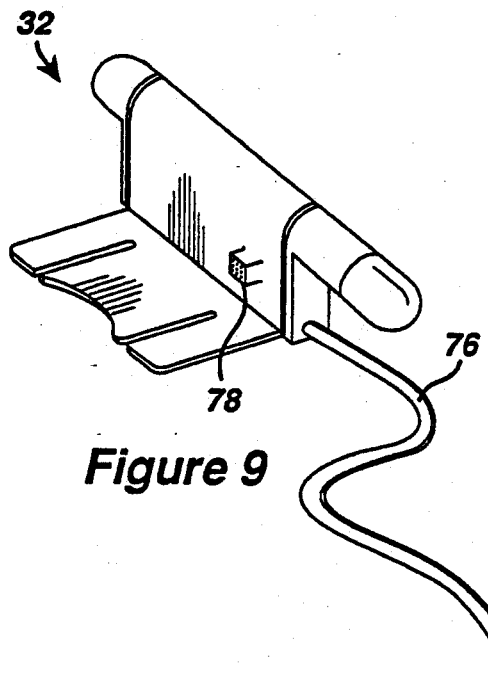
FIG. 9 is an isometric view of an alternative embodiment of the attachment assembly having an electrical connection to the computer.

As shown in FIG. 9, the attachment assembly 35 may include an electrical cable 76 for connecting to an input port of the computer. A receptacle 78 mates with an input jack of the pointing device 30 for providing electrical coupling between the pointing device 30 and the computer (not shown). In an alternative embodiment, as shown in FIG. 5, the cable 76 extends from the pointing device 30 for coupling to the computer serial port in a manner well known in the art. As is known in the industry, the pointing device may transmit the command via radio-frequency, infrared or some other wireless operation.

Figure 10:
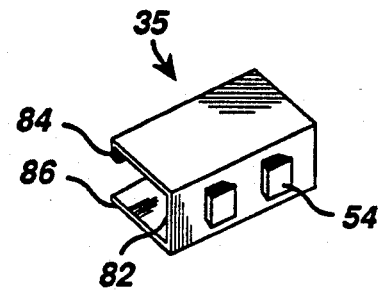
FIG. 10 is an alternative embodiment of a clamping assembly for coupling to the keyboard.

FIG. 10 illustrates an alternative clamping assembly 35 in the form of a clip 80. The clip 80 includes a flexible C-shaped wall 82 having a flange 84 for fixing it to the computer 34. The clip 80 includes a pair of dovetail mounts 54 for receiving the tilting assembly 37, as shown and described with respect to FIG. 6. The clip 80 is made of a flexible, yet resilient, material to permit a user to spread the upper flange 84 sufficiently away from a lower wall 86 to slide the clip over the edge of the computer 34. The flange 84 extends down into the depression provided for the keys of the computer 34 to hold the clip 80 firmly on the computer 34. The clip embodiment of the clamping member 35 has a constant width and is custom-made for each different type of keyboard or computer. A different size clip 80 is required for different keyboards or for coupling to different places on the same keyboard.

Figure 11:
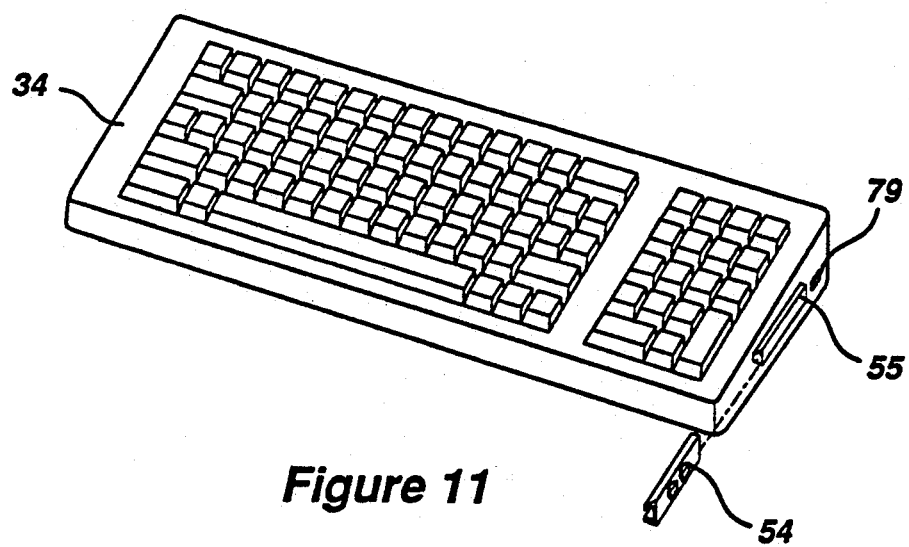
FIG. 11 is an alternative embodiment of a clamping assembly rigidly extending from the keyboard.

FIG. 11 illustrates a dovetail mount 55 extending from the side of a computer 34. In the embodiment of FIG. 11, the dovetail mount 55 is formed as an integral, unitary member with the computer 34. The tilting assembly 37 is directly coupled to the keyboard via dovetail mount 55. The custom keyboard of FIG. 11 also includes a jack 79 for mating with a receptacle (not shown) of the pointing device 30. Alternatively, the keyboard may not include the jack 79 and the pointing device may be coupled to the computer via a cable 76. The keyboard manufacturer builds the keyboard having dovetail mount 55 for receiving the tilting mechanism 37; and the jack 79. The dovetail mount 55 may be a single mount or a pair of mounts. If manufactured as a single mount, an adapter may be attached to convert it to a pair of mounts 54 as shown in FIG. 11.

Figure 12A:
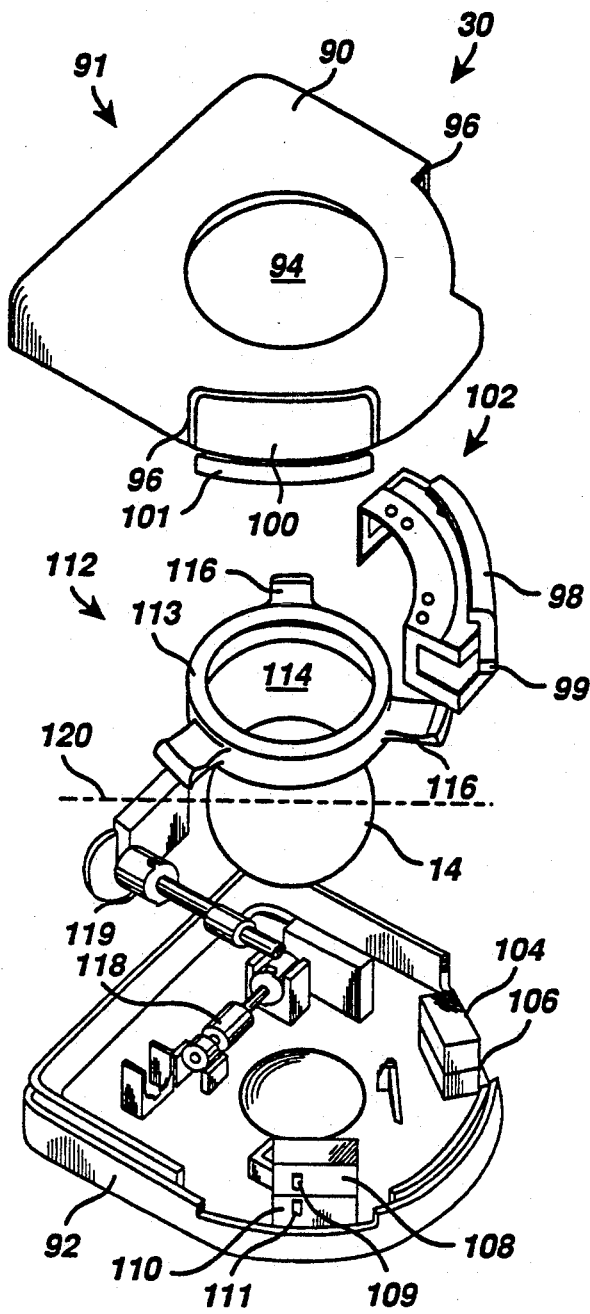
FIG. 12a is an exploded isometric view of the inventive pointing device.

As shown in FIG. 12a, the pointing device 30 housing 91 includes an upper housing 90 and a lower housing 92. The upper housing 90 has an aperture 94 through which the ball 14 extends for rotation by a user. The upper housing 90 includes recesses 96 for receiving buttons 98–101. An upper ball retainer 112 is within the housing 91 of the pointing device 30. The upper ball retainer 112 has an aperture 114 with a diameter less than the diameter of the ball for preventing the ball from falling out of the pointing device when it is inverted. The upper ball retainer 112 includes a ring 113 and support flanges 116 for holding the ring 113 within the housing 90. The upper ball retainer 112 contacts the ball 14 above the center line 120 to prevent the ball from falling out when the pointing device 30 is tilted in a vertical or upside-down orientation. A lower ball retainer 118 contacts the ball 14 below the center line 120 to support the ball. The lower ball retainer 118 includes a rotational encoder 119 for generating a signal in response to rotation of the ball 14. Any suitable rotational encoder known in the art may be used for the encoder 119. U.S. Pat. No. 4,562,314, to Hosogoe et al., incorporated herein by reference, illustrates a rotational encoder suitable for use with this invention.

The center line 120 of the ball 14 is defined relative to the housing 91 as extending generally in a plane parallel to the bottom of the housing. When the housing is in a generally vertical orientation, as shown in FIG. 3, the center line 120 remains in the same position relative to the housing, though it is vertical in absolute sense. The center line may thus extend generally vertically, or at some angle.

As shown in FIG. 12a, the ball retainer includes support flanges 116 and the ring 113 are rigid members. The ball 14 is firmly retained against the lower ball retainer 118 and encoders 119 by a resilient biasing member 116, regardless of the orientation of the pointing device 30. The flanges 116 are relatively rigid, yet resilient members that hold the ring 113 in a stationary position relative to the housings 90 and 92 and the internal structure within the pointing device 30 to press the ball 114 against the encoders 119 and 118 when the housing is inverted. The encoders 119 may include a spring, such as that shown in the ,314 patent or in U.S. Pat. No. 4,612,539, to bias them into contact with the ball 14 and provide some give relative to the rigid members 116, if desired.

Figure 12B:
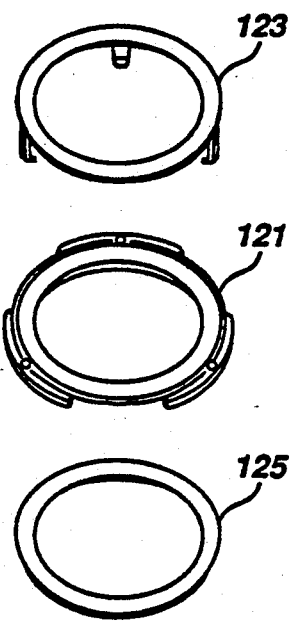
FIG. 12b is an exploded isometric view of an alternative embodiment of an upper ball retainer.
Figure 12E:
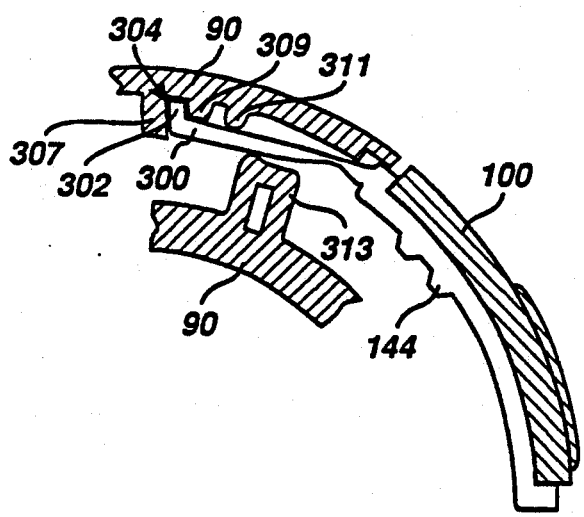
FIG. 12e is a top, plan view of an alternative embodiment of a button configuration.
Figure 12C:
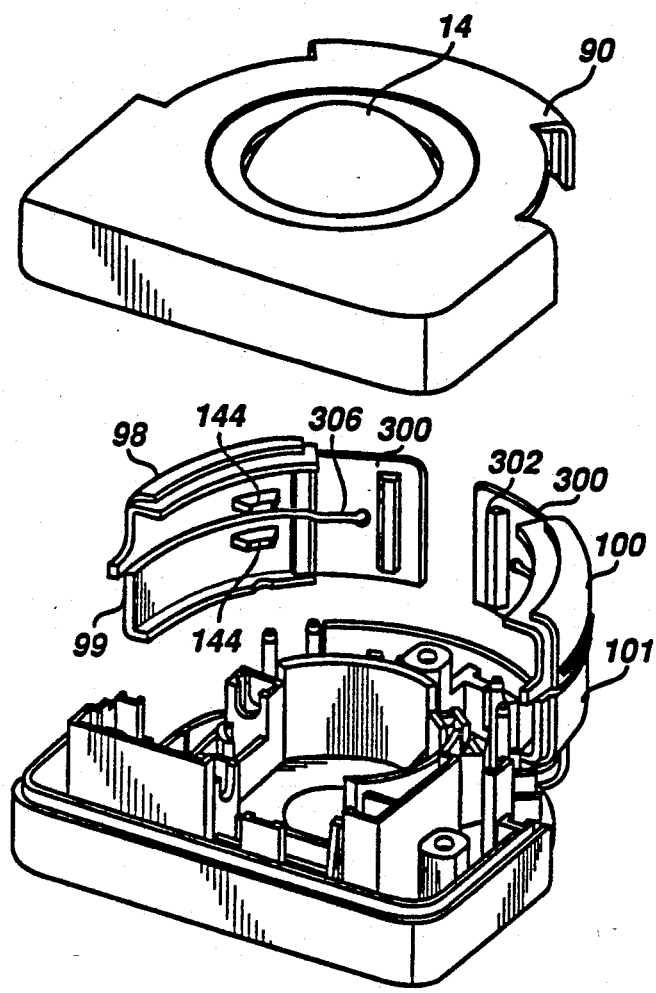
FIG. 12c is an exploded isometric view of an alternative embodiment of a housing and button configuration.
Figure 12D:
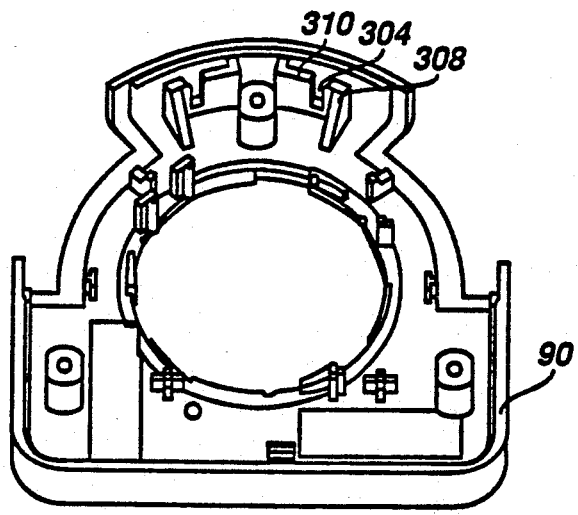
FIG. 12d is an isometric view of the upper housing of the alternative embodiment of FIG. 12c.

FIGS. 12c and 12d illustrate an alternative embodiment for mounting buttons 98–101. The buttons include an integrally extending cantilever portion 300. The cantilever portion 300 includes a tab 302 for mating with slot 304 of upper housing 90 and lower housing 92. Upstanding ridges 308 and 310 on either side of slot 308 contact the beam portion 300 and firmly retain it while permitting sufficient pivoting motion that the buttons may be moved to depress the respective microswitches. Additional ridges may be used for retaining the tab 302 or portion 300. The buttons are mounted in the housing 91 by sliding the tab 302 into the retaining slot 304 of one half of the housing into making contact. Mounting the buttons during assembly of the mouse is thus quick and relatively easy, which improves the manufacturability and reliability of the buttons. Most buttons of the prior art are mounted by heat staking techniques, which is more time-consuming, depends more on the skill of the operator and is thus more likely to have quality and reliability problems.

The buttons 98 and 99 are integrally formed as a single member. A part 10 can be economically made in a single injection mold and shaped to provide two buttons. The slot 306 extending from cantilever portion 300 permits the respective buttons to flex, and thus be depressed, independent of each other, even though they are integrally coupled to a single beam portion 300. The exposed portions of the buttons 98-101 have the same curvature as the housing, providing a smooth, continuous surface. Flange members 144 are positioned to enable the microswitches when the buttons are depressed, as shown in the cross-sectional view in FIG. 18d.

FIG. 12b illustrates an exploded view of an alternative embodiment of the upper ball retainer 112 having a metal leaf spring member 121, a housing member 123 and a ball contact member 125. The housing member 123 is coupled to the ball contact member 125 with the spring 121 held between them, pushing them apart from each other. The ball contact member 125 contacts the ball 14 and retains it in position. The housing member 123 is coupled to upper housing 90. The ball contact member 125 is spring biased into retaining contact with ball 14 by spring 123. The ball contact member 125 "floats" in the housing on spring 123; that is, it is coupled to the housing 90 only via spring 121. The spring size and spring constant are selected to urge the ball into contact with encoders 119 for encoding the signal, regardless of the position of the housing 91. If the housing is in the horizontal position, the spring need provide only minimum or no force because gravity will hold the ball 14 in contact with encoders 119. If the housing 91 is tilted at some angle or even inverted, the spring 121 will urge the ball contact member 125 into ball 14 to retain the ball 14 in contact with the encoders 119 while permitting easy and smooth rotation of the ball by a user.

The ball housing member 123 functions as the ball retaining member 112. The ball housing member 123 is held in the housing 91 by tabs mating with slots. The ball housing member 123 is easily removable from the housing 91 by rotating the ball housing 123 to align the tabs with openings in the slots that permit it to slide out of housing 91. The ball 14 may then be removed for cleaning, replacing, or the like.

While the lower ball retainer 118 shown herein includes an encoder, the retainer 118 may be merely a ring, a roller bearing, or any other ball retainer in contact with the ball 14 below the center line for retaining the ball. The encoders 119 may contact the ball at any point on its surface. For example, the encoders may be adjacent or part of upper ball retainer 112. The encoding may be accomplished through contact of the ball 14 above the center line 120, the lower retaining member 118 merely providing support. The resilient member may be any member that resiliently bias the ball retainer into supporting contact with the ball. Other types of resilient members, in addition to the metal leef springs, foam springs, or plastic springs shown may be used. The ball retainer 112 may also be positioned under the ball 114 or on one side for the ball pressing into contact with the encoder 119, regardless of the orientation of the pointing device.

FIG. 12e illustrates an alternative embodiment of a button having a cantilever beam portion 300. This embodiment is similar in most respects to the embodiment of FIGS. 12c and 12d, however. There are some differences. The cantilever beam portion 300 has the tab 302 at the end of the beam portion 300 instead of in the general region of the end, as shown in FIG. 12c. The slot 304 is formed between ridges 307 and 309 on the upper housing 90 and lower housing 92. Upstanding ridges 309 and 311 are positioned to support and retain the button 100 in cooperation with ridge 313. The ridges 309, 311 and 313 are molded into the upper housing 90 and lower housing 92 to contact the cantilever beam portion 300 and retain the buttons in the housing yet permit flexible movement for depressing the respective microswitches. The embodiment of FIG. 12e has the same advantages in assembling the pointing device described with respect to FIGS. 12c and 12d. That is, the buttons may be quickly slid into position and are firmly retained by contacting the ridges to provide reliable operation.

Figure 13:
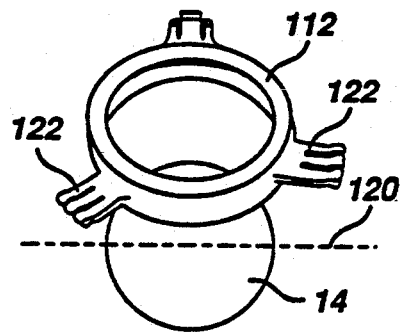
FIG. 13 is an isometric view of a ball retainer having a leaf spring.

As shown in FIG. 13, an alternative embodiment of the upper ball retainer 112 includes a molded, unitary member, multistage leaf spring 122. The multistage leaf spring 122 is an elastically deformable, resiliently biased member. The leaf spring 122 biases the ball 14 into the lower ball retaining member 118. The resilient member 122 ensures that the ball 14 is firmly biased against the encoders even though the pointing device is in a vertical orientation, inverted, or in any other orientation.

Figure 14:
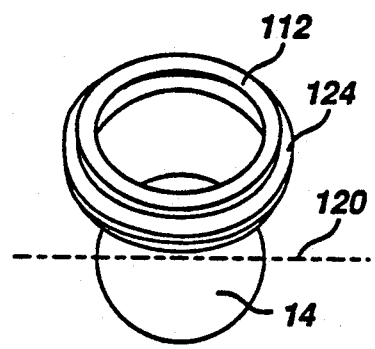
FIG. 14 is an isometric view of an alternative embodiment of a ball retainer having a foam-type spring.

An alternative embodiment of a resilient member is shown in FIG. 14. The upper ball retainer 112 includes a foam-type, elastomer or rubber spring 124 for applying a biasing pressure against the ball 14. The spring 124 is similar in function and operation to the leaf springs 122, as shown in FIG. 13. An elastomer provides the advantage of dampening high frequency vibrations and providing a solid, resilient, spring-type member to retain the ball in firm contact with the encoders 119. The elastomer has a geometry that allows it to uniformly compress. A coil spring, comb disk spring, or other type of spring may be used in place of springs 122 or 124.

Figure 15:
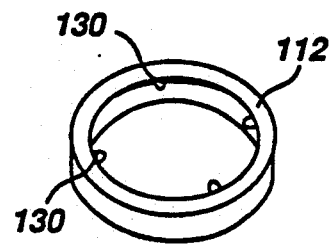
FIG. 15 is an isometric view of an alternative embodiment of a ball retainer having bearings.
Figure 15:
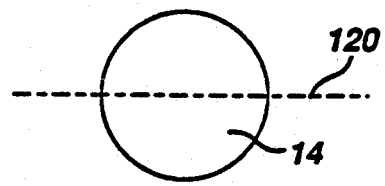

As shown in FIG. 15, the upper ball retainer 112 may include a plurality of bearings 130 contacting the ball 14 above the center line 120. The bearings 130 provide a substantially friction-free surface in the inner diameter of the ring 113 to provide smooth and easy rotation of the ball 14. The bearings 130 may be used with a rigid ring 113 not having any resilient member or spring, as shown in FIG. 15. The ball 14 is held sufficiently tight against the encoders 119 that accurate encoding occurs even though the pointing device 30 is vertically oriented or inverted. The bearings 130 may be fixed bearings, roller bearings or any other type of bearing suitable for use with ring 112. The bearings 130 may also be used in combination with a ring 113 having a resilient member therein such as the leaf spring of FIG. 13, the foam-type spring of FIG. 14, or the like.

Figure 16:
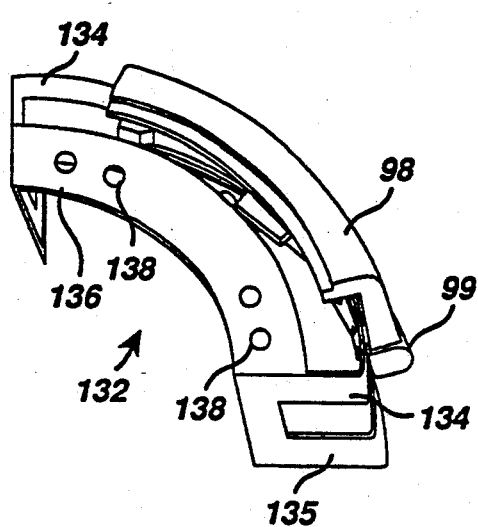
FIG. 16 is an isometric view of a mounting assembly for buttons in the housing.
Figure 17:
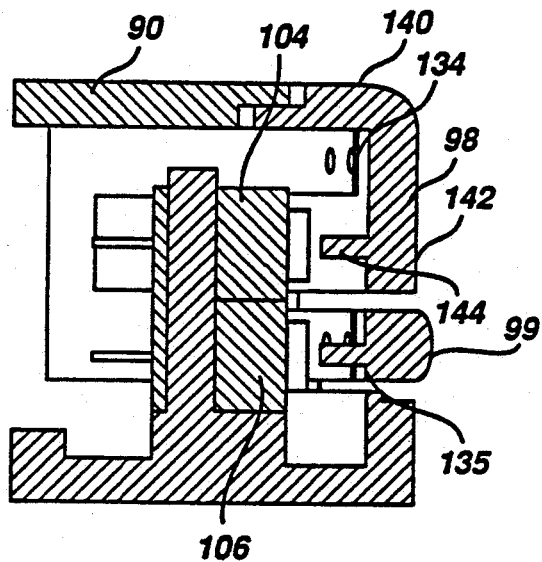
FIG. 17 is a partial cross-sectional view of the button mounting assembly of FIG. 16.

FIGS. 16 and 17 illustrate a support frame 132 for the buttons 98 and 99 to facilitate activation of the microswitches 104 and 106. Button 98 extends from the top surface of housing 90, around the corner, and along the side of the housing 90. The buttons 98 and 99 are mounted on support frame 132. The support frame 132 includes a coupling member 136 rigidly attached to the underside of housing 90 through fixtures 138 by any suitable method known in the prior art, such as plastic welding, heat staking or the like. Sheet metal support ribbons 134 and 135 support buttons 98 and 99, respectively. The buttons 98 and 99 are coupled to strips 134 and 135 by any suitable method, such as heat staking, plastic welding, or the like. As best shown in FIG. 12, microswitches 104, 106, 108 and 110 are located within the housing 91 for activation by the respective buttons 98-101, as shown in FIG. 12. Microswitches 104, 106, 108, and 110 include switch elements 105, 107, 109 and 111, respectively.

As shown in FIG. 17, the button 98 is spaced from the housing 90 to permit the button to move inward when depressed. Pressing of the button 98 from the side 142 inward causes the support member 134 to elastically deform inward to depress switch element 105 and activate microswitch 104 by contact with flange member 144. Depressing the button 98 on the top surface 140 also activates the microswitch 104. Depressing the top surface 140, near the corner, causes the support member 134 to rotate clockwise, undergoing an angular displacement. As the support member 134 undergoes an angular displacement, flange member 144 contacts and depresses the switch element 105 to activate the microswitch 104. Thus, a user may apply force either from the top downward or from the side inward to activate microswitch 104.

Button 99 is positioned vertically below and extends horizontally along the length of button 98, as best shown in FIG. 17. The buttons are spaced vertically, one above the other, and extend horizontally around the outer surface of the housing 91. Depressing the button 99 from the side inward activates the microswitch 106 in a manner similar to that described with respect to microswitch 104.

Figure 18A:
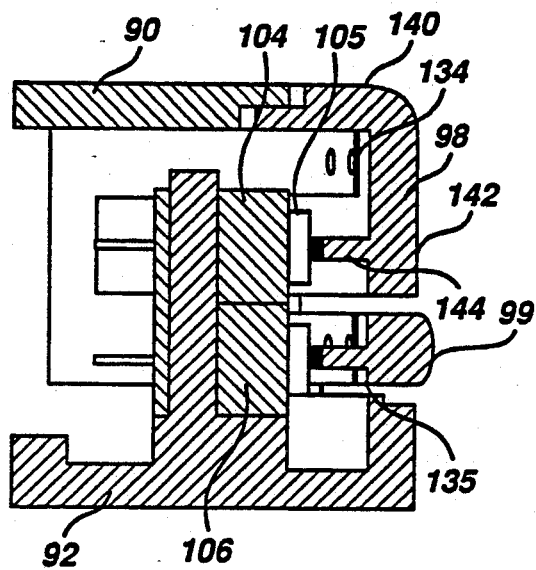
FIG. 18a is a partial cross-sectional view of an alternative embodiment of the button mounting assembly.

FIG. 18a illustrates an alternative embodiment of the activation of microswitches 104 and 106. In the alternative embodiment, the buttons 98 and 99 are physically coupled to the microswitches 104 and 106, respectively. The microswitch 104 is activated when flange 144 of button 98 is pressed toward or pulled away from the microswitch 104. Thus, pressing from the side inward on outside edge 142 of button 98 depresses control button 105 to activate microswitch 104. Pressing on the top edge 140 at a region closer to the center of the housing 91 than the support strip 134 causes the support strip 134 to rotate counterclockwise, undergoing angular displacement and pulling the flange 144 away from the microswitch 104, as shown by the arrow of FIG. 18a. As the flange 144 pulls away from the microswitch 104, the switch element 105 is pulled outward, activating the microswitch 104. The activation of the microswitch 104 by either depressing or pulling on the switch element 105 is indistinguishable to the user and both result in an identical actuation signal being sent to the computer. The advantage of providing activation of the microswitch 104 by flange 44 moving toward or away from the microswitch is that the microswitch is activated by pressing on any region of the button, whether from the side inward, from the top downward, or at any position along the button. Further, if the user presses on the side 142 of the button at a location significantly spaced from the microswitch 104, the switch will still be activated, even though the flange 114 may be pulled away from rather than pushed towards switch element 105. Microswitch 106 is similarly mechanically coupled to button 99 for activation by either pushing or pulling in the alternative embodiment of FIG. 18a, providing similar advantages.

Figure 18B:
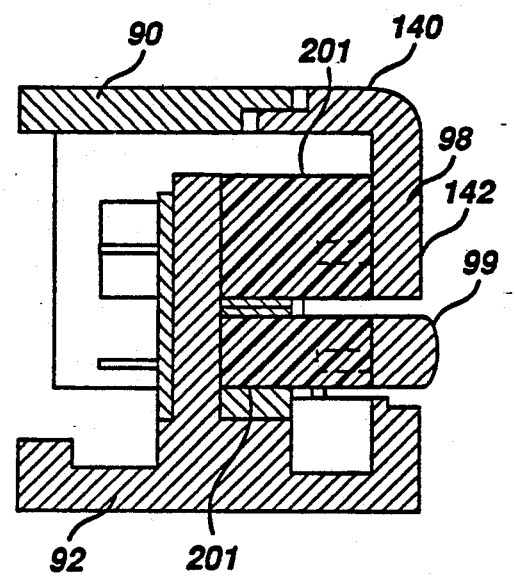
FIG. 18b is a partial cross-sectional view of an alternative embodiment of the button mounting assembly.

In an alternative embodiment shown in FIG. 18b, elastomeric rubber mounts 200 and 201 couple the buttons 98 and 99 to the housing 91. The elastomeric rubber mounts 200 deform whether pushed downward from the top, inward from the side, upward from the bottom or pulled. A rubber with a high damping rate to prevent key bounce and ensure that the buttons return to their normal positions is selected for elastomeric mounts 200 and 201. The buttons are physically coupled to the microswitches, in a manner similar to that shown in FIG. 18a, to activate the microswitches whether the switch element is pushed or pulled.

The mounting members 134 and 135 may be any suitable member permitting deflection of button 98 from the top downward or from the side inward. For example, in the embodiment of FIG. 18, having the button 98 rigidly coupled to the microswitch 104, the support member 134 may be a member that is elastically deformable in two or three dimensions and thus need not undergo angular displacement. Pressing from the top downward would elastically deform such a support member 134 downward, pulling the button 98 away from microswitch 104 to activate the switch. Pressing from the side 142 inward depresses the switch member 105 to activate the microswitch 104. A rubber, plastic, or other rod capable of resilient and elastic deformation would be suitable for use as the support member 134.

The ability to activate a button by either pressing from the top downward or from the side inward provides significant advantages for a pointing device whose orientation may vary as selected by a user. If the user elects to maintain the pointing device in the horizontal orientation, as shown in phantom lines in FIG. 3, he may prefer pressing on the side inward to activate microswitch 104. However, if a vertical orientation is used, the user may desire to press from the top downward, the top now being in the position of a side extending vertically and the side 142 now appearing as a top.

Figure 18C:
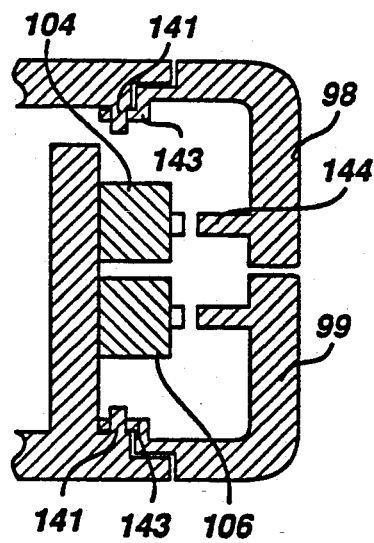
FIG. 18c is a partial cross-sectional view of an alternative embodiment of the button mounting assembly.

FIG. 18c illustrates an alternative embodiment of mounting buttons on the housing. The alternative embodiment is a known prior art, heat staking technique and described in U.S. Pat. No. 4,613,853, incorporated herein by reference. According to this prior art method, one or more stakes 141 extend from housing 90 and through holes in the buttons 98-101. The ends of the stakes 141 are then enlarged by melting them. The buttons pivot about the stakes 141 and move sufficiently to estimate the microswitch whether pushed from the top, downward; the side, inward; or the bottom, upward. As can be seen from FIG. 18c, the button 98 extends over the top and along the sides of the housing 90, and button 99 extends over the bottom and along the sides of the housing 90.

Figure 18D:
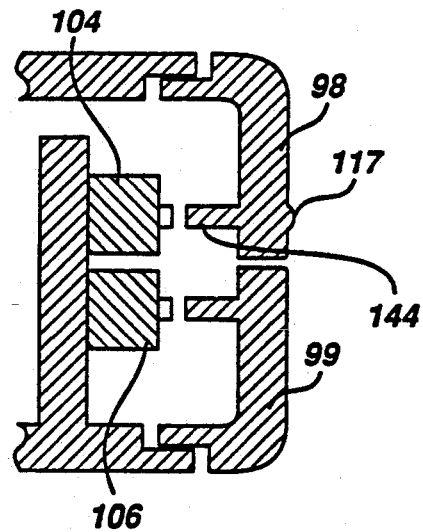
FIG. 18d is a partial cross-sectional view of an alternative embodiment of the button mounting assembly.

FIG. 18d is a partial cross-sectional view of the buttons of FIGS. 12c and 12e. A ridge 117 is on the upper buttons 98 and 100, to permit a user to identify the respective buttons and the orientation of the housing by feel. The buttons 98 and 99 are coupled to the housing 91 by cantilever beam portion 300, not shown in this figure, and thus effectively float with respect to the housing in the portion adjacent the microswitches 104 and 106. In one embodiment, the buttons are activated by pressing from the side, inward, but not by pressing from the top, downward or bottom, upward. For example, in one embodiment having a cantilever beam 300 mounted by a tab 302 in a slot 304, the buttons pivot about a vertical axis for depressing the microswitches, but not about a horizontal axis. Accordingly, the pointing device 30 is suitable and falls with the scope of this invention if the buttons are depressible in only a single direction and not in multiple directions.

Figure 19:
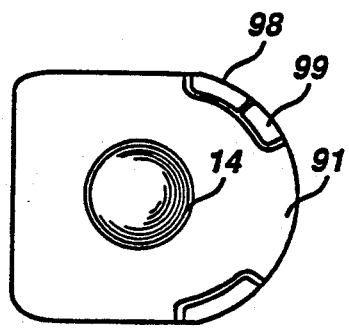
FIG. 19 is a top plan view of an alternative embodiment of button placement.

FIGS. 19-25 illustrate alternative embodiments of button placement around housing 91. As shown in FIG. 19, the buttons 98 and 99 may be spaced horizontally from each other and overlap both the top and sides of the housing 91. The user selectively depresses either button 98 or 99, depending on the command desired to be entered into the computer. FIG. 20 illustrates a button 98 extending over the top and sides of the housing 91 and a button 99 extending from the side of the housing 91 and spaced horizontally from the button 98.

Figure 21:
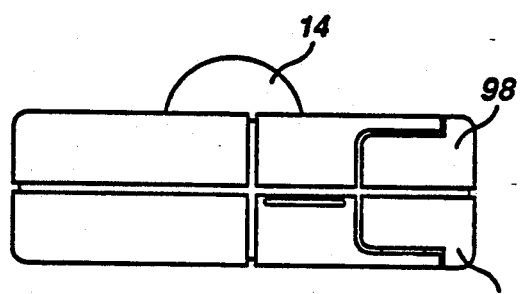
FIG. 21 is a side elevational view of an alternative embodiment of button placement.

FIG. 21 illustrates a button 98 extending over the top and side of the housing 91 and a button 115 extending over the side and bottom of the housing 91. In this embodiment, the buttons 98 and 115 are spaced vertically, one above the other, and both extend generally from a center region, along the side, to respective top and bottom surfaces. A user is able to activate button 98 by pressing from either the top downward or the side inward. Button 115 is activated by pressing from the side inward or from the bottom upward. Of course, if the housing 91 is vertically oriented, as shown in FIG. 3, the relative positions of the buttons 98 and 107 remain the same with respect to the housing 91, although the absolute positions vary. Thus, while the user is still pressing from the bottom of the housing upward to activate the button 101, in relative terms, he is pressing from the side inward, in absolute terms.

Figure 22:
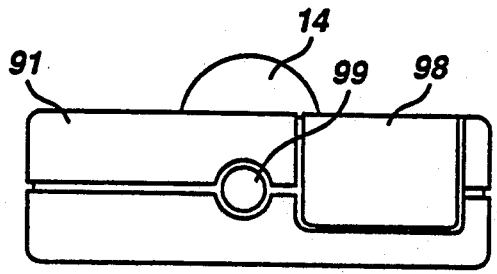
FIG. 22 is a side elevational view of an alternative embodiment of button placement.
Figure 23:
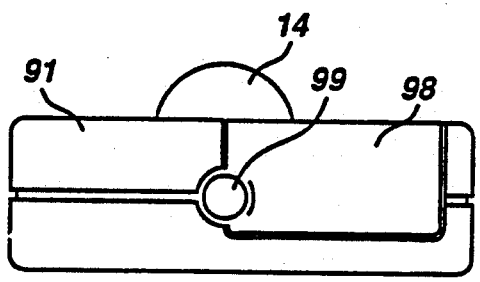
FIG. 23 is a side elevational view of an alternative embodiment of button placement.
Figure 24:
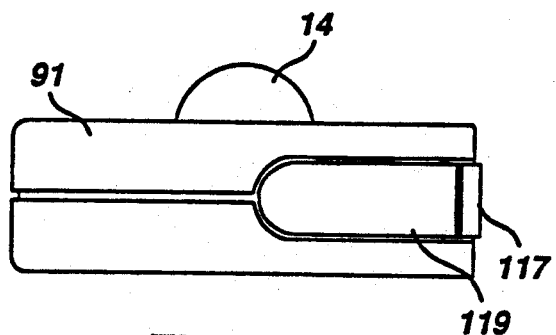
FIG. 24 is a side elevational view of an alternative embodiment of button placement.
Figure 25:
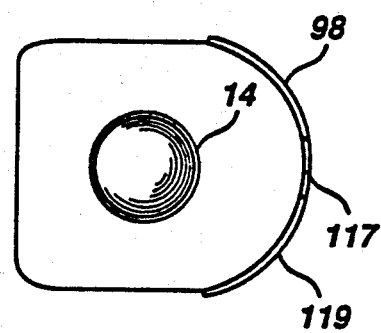
FIG. 25 is a top plan view of the embodiment of FIG. 24.

FIG. 22 illustrates a button 98 overlapping the top and side of the housing 91 and a button 99 spaced horizontally behind button 98. FIG. 23 illustrates a button 98 overlapping the sides and top of the housing 91 and a button 99 surrounded by the button 98. Depressing the circular button 99 within the region 98 activates microswitch 106. Depressing button 98 on any portion thereof, including the regions surrounding button 99, activates microswitch 104. FIGS. 24 and 25 illustrate three buttons 98, 117, and 119 extending from the side of the housing and spaced horizontally from each other. The three buttons 98, 117, and 119 do not overlap the top of the housing 91 and are activated only by pushing from the side inward.

The pointing device 30 may have the respective buttons 98-101 organized in any one of the combinations shown or variations thereof. Alternatively, a switch 93 may be activated by pressing ball 14 downward to enter commands into the computer. The switch 93 is positioned below the ball 14 in housing 91 for activation by pressing ball 14 downward. One switch that may be used is a linear strain gauge 93. The output of the strain gauge 93 corresponds to the downward pressure applied by a user's hand. The rate of cursor movement on the screen is varied based on the output from the strain gauge 93. Software in the computer varies the cursor speed based on this signal. A user selects the desired response based on the output from the strain gauge 93. The user may select a threshold pressure at which the strain gauge 93 output affects cursor movement on the screen or provides some other output signal. For a great deal of pressure, the rate of movement is proportionally sped up (or slowed) to permit more rapid (or exact) cursor positioning. For example, pressing ball 14 into a lower position causes rapid (or alternatively, fine) cursor movement when the ball is rotated. Having the ball in the standard position provides normal cursor movement. Alternatively, the switch activated by depressing the ball 14 may enter the same commands entered by one of the buttons 98-101. In one embodiment, the user elects whether to enable or disable the switch 93 associated with ball 14. In an alternative embodiment, the switch 93 is not present.

The enabling for operation of the four buttons 98, 99, 100, and 101 is selected by a user. Generally, the user will select a pair of the buttons, either pair 98 and 99 or pair 100 and 101, to be operational for receiving inputs for the computer by software commands entered into the computer. Alternatively, dip switches in the pointing device may be provided to enable different combinations of buttons. One of the buttons, generally 98, is selected as the primary button for entering certain commands and button 99 is selected as the secondary button for entering different commands with the cursor in the same position. The user selects which of the two buttons is secondary or primary within the enabled pair. The user disables buttons 100 and 101 so that they are not operational. Activation of microswitches 108 and 110 thus does not provide input commands to the computer. The dip switches are coupled in series with the microswitches to open or close a switch connecting the output pins to the computer with the respective microswitches. Switches could also be wired into the pointing device by a person of ordinary skill in the art to permit a user to select the combinations described herein.

The user selects which of the two pairs of buttons will be enabled based upon his desired orientation, position, and use of the pointing device 30. If the pointing device 30 is on the right-hand side of the housing, the user will generally select buttons 98 and 99 as the enabled pair. If the pointing device 30 is on the left-hand side of the housing, the user will generally select the pair 100 and 101 as the enabled pair.

Through the appropriate software in the computer, the user is given broad control to program the function of each button. In one embodiment, the user may select both of the top buttons 98 and 100 as the enabled pair and disable buttons 99 and 101 extending from the sides of the housing. Alternatively, the user may enable buttons 99 and 101 as a pair and disable buttons 98 and 100. In one embodiment, the user enables all four buttons, with the top two buttons 98 and 100 inputting the same command and the side buttons 99 and 101 inputting the same command as each other, but a different command than buttons 98 and 100. Alternatively, the buttons may each enter a different command into the computer. For example, in one embodiment, all four buttons, only three buttons or some combination, are enabled. Each button inputs a different command into the computer, as programmed in the software by a user. Because each microswitch outputs a uniquely identifiable signal, each button may provide a unique command, if desired. The user is thus able to select which of the buttons are enabled for inputting commands into the computer, performing a drag function, automatically pulling down a menu, or the like. The user may selectively enable any single button, combination of buttons or pairs of buttons.

FIGS. 26-36 illustrate an alternative embodiment of a pointing device 30. The buttons 98-101 are coupled to the housing 91 by any suitable method. In one embodiment, the buttons 98-101 are coupled to the housing 91 by heat-staked pins in a manner well known in the art, as shown in FIG. 18c. The use of heat-staked pins for buttons on a pointing device is presently used on many pointing devices on the market today, such as the Microsoft mouse, as described in U.S. Pat. No. 4,613,853, or the prior art device of FIG. 1, their use and construction being well known in the art.

Figure 26:
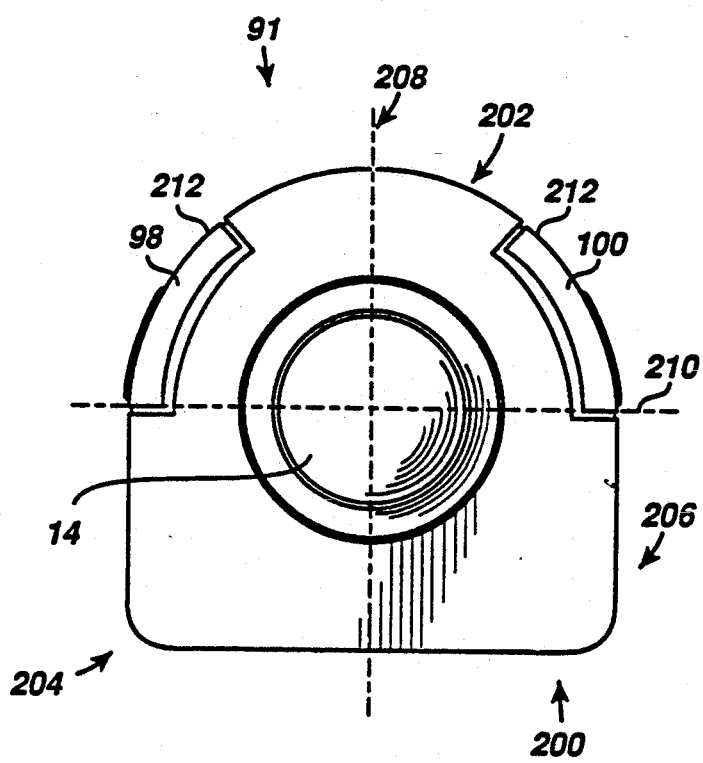
FIG. 26 is a top plan view of an alternative embodiment of the pointing device.
Figure 27:
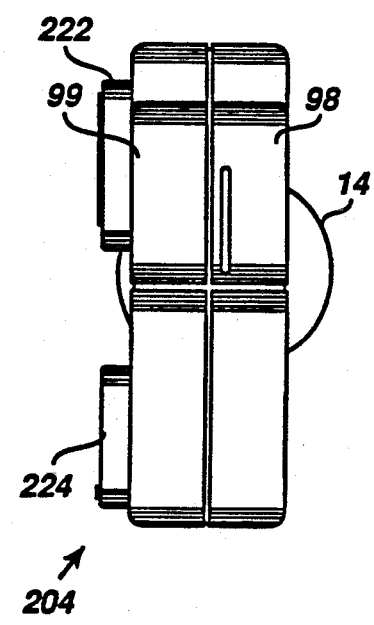
FIG. 27 is a side elevation of the device of FIG. 26.
Figure 28:
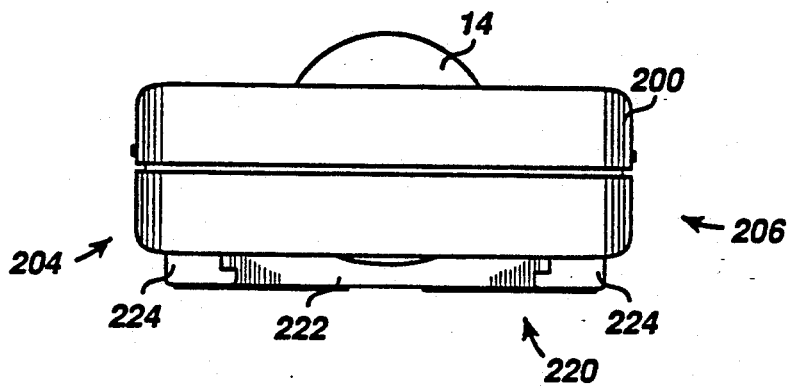
FIG. 28 is a front elevation of the device of FIG. 26.
Figure 29:
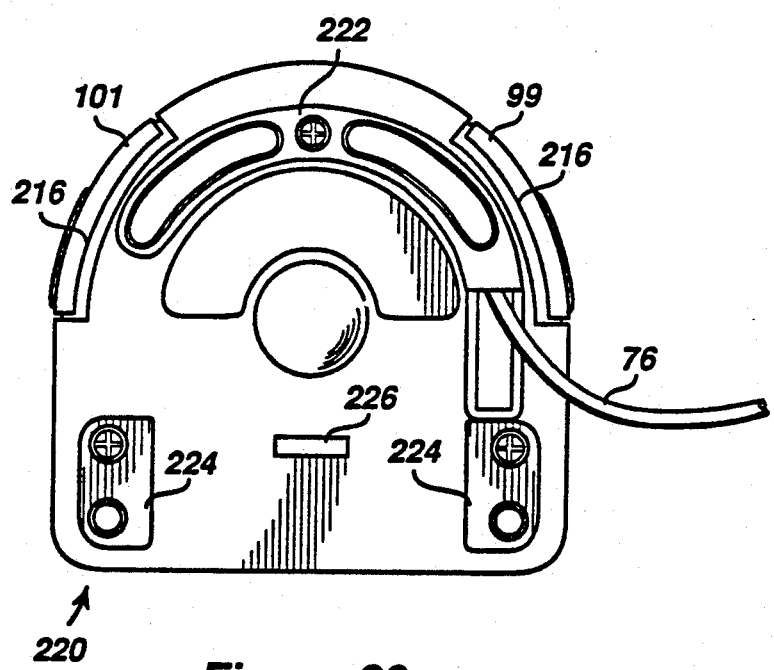
FIG. 29 is a bottom, plan view of the device of FIG. 26.

As shown in FIGS. 26 and 27, the housing 91 includes a forward side 200 and an aft side 202. The housing also includes a right side 204 and a left side 206, being viewed facing the forward side 200. The forward side 200 is configured for mating with the tilting assembly 37 and, in the embodiment shown, is relatively flat. The aft side 202 is arcuate shaped, having a curving contour and periphery which is pleasing to the view and comfortable to use for the user. The sides 204 and 206 extend perpendicular to the forward side 200 for a short region and curve into an arcuate shape to form the aft region 202.

The ball 14 is positioned generally in the central region of the housing 91, approximately equally spaced from the right and the left sides and from the fore and aft sides. The ball 14 includes a vertical center line 208 and a horizontal center line 210. The vertical center line 208 is approximately at the center of the housing 91. In the embodiment shown in FIG. 26, the horizontal center line 210 extends parallel to front side 200 and is also generally in the central region of the housing 91, although this is not necessarily required. The ball 14 need not be centered with respect to any side of the housing, but may be positioned at any convenient location for easy access by the user.

The buttons 98-101 extend from a position overlapping the ball's horizontal center line 210 to a position aft of the center line. Having the buttons extend from a position approximately aligned with or, alternatively, forward, of the center line to a position aft of the center line, provides greater accessibility to a user for pressing the buttons regardless of the orientation selected by the user.

The buttons 98-101 extend circumferentially around the outside region of the arcuate shaped housing 91. Buttons 98 and 100 each include a respective surface region 212 extending on the upper surface of the housing 91 and a side surface region 214 extending along the side of the housing 91. Similarly, the buttons 99 and 101 include a bottom surface region 216 extending along the bottom of the housing 91, and a side surface region 218 extending along the side of the housing 91. The buttons thus overlap the top and bottom surfaces, respectively. The buttons have an arcuate shape having generally the same radius of curvature as the housing's arcuate peripheral shape. The contour of the buttons and housing is generally smooth, having a matching contour. In one embodiment, the arcuate shapes are concentric, though this is not required.

The buttons are mounted in the housing 91 against respective microswitches 108 and 104 to depress the microswitches whether pressed from the sides or from the top. Conventional heat-staking techniques of coupling the button onto the housing permits sufficient flexibility to activate the microswitch under the button whether pressed from the top or the side, given the configuration of FIGS. 26-27.

The bottom of the housing includes a receiving member 220 and a support foot 222. The receiving member 220 includes a pair of retaining members 224 and a recessed slot 226. The retaining members 224 may also function as support feet. The retaining members 224 and recessed slot 226 are shaped and configured to mate with the tilting assembly as will be described in more detail with respect to FIG. 34. Aft support foot 222 is the same height as retaining members 224 so that the pointing device may sit flat on a work surface if desired. Alternatively, the housing weight is supported totally on the tilting assembly and thus by the computer, as explained in more detail elsewhere herein.

Figure 30:
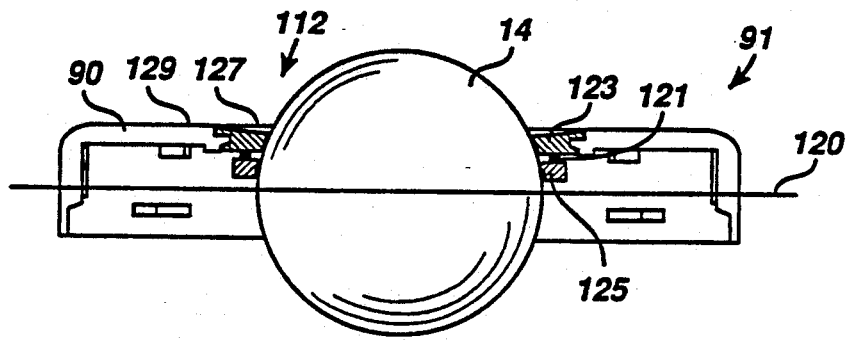
FIG. 30 is a partial cross-sectional view of the device of FIG. 26.

FIG. 30 illustrates a ball retaining assembly 112 having a housing member 123, a spring member 121 and a ball contact member 125. The housing member 123 is coupled to the upper half of the housing 91 by any conventional method. The upper surface of the housing member 123 is concave adjacent to ball 14, providing a recessed region 127 below the upper surface 129 of housing 90. The concave surface exposes a greater portion of ball 14 to provide easier manipulation of the ball by a user.

Figure 31:
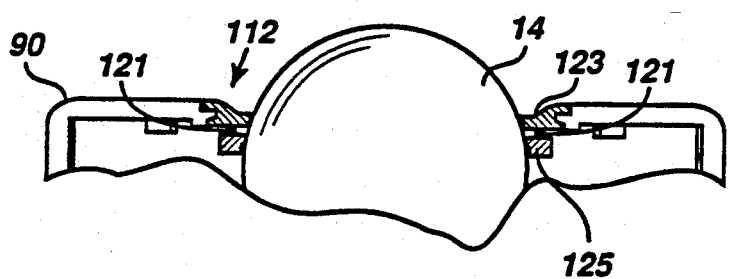
FIG. 31 is a partial cross-sectional view of an alternative embodiment of the device of FIG. 26.
Figure 32:
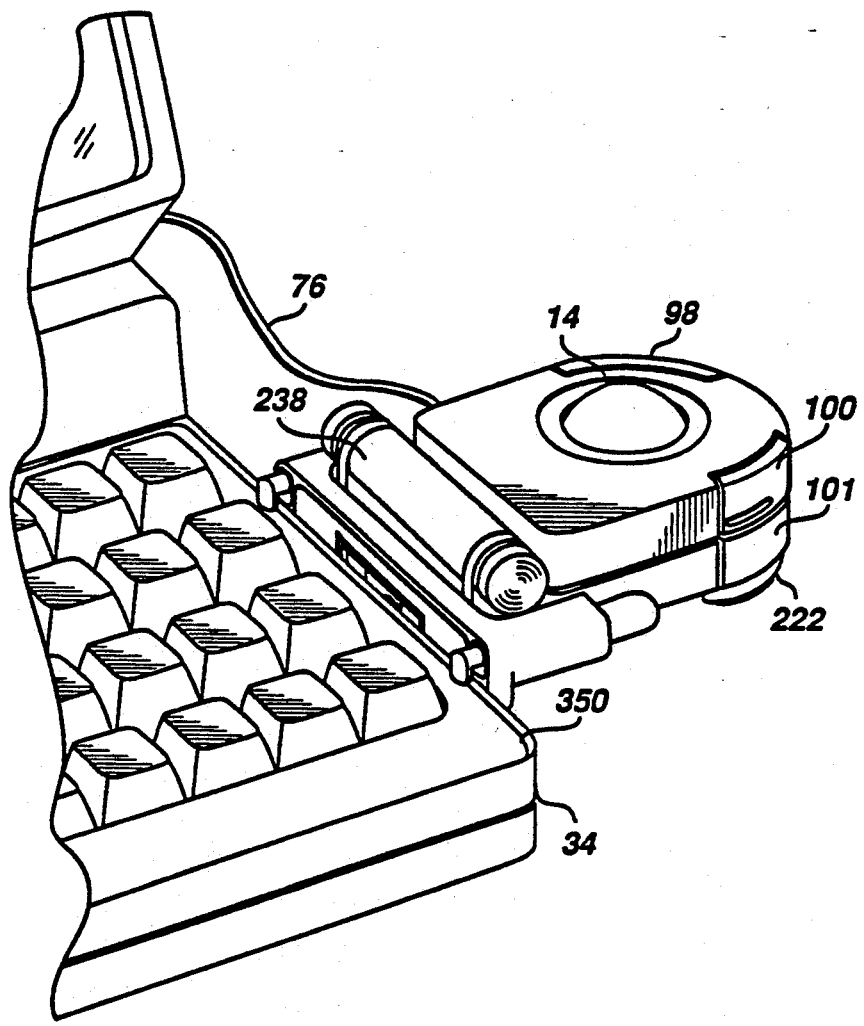
FIG. 32 is an isometric view of the pointing device of FIG. 26 coupled to a computer via an attaching assembly and clamp.

The ball contact member 125 is coupled to the ball just above the center line 120. The ball contact member 125 prevents the ball 14 from coming out of the housing 91 when the housing is inverted. FIGS. 31 and 32 illustrate alternative shapes for recess 127. Various different shapes could be used, such as the concave recess 127 of FIG. 30, the step recess 127 of FIG. 31, or the sloping recess of FIG. 32.

The housing member 123 provides significant advantages in permitting the shape of the housing 91 to be selected independent of the ball shape, diameter and exposed surface area. The housing 91 is designed having a desired contour and shape for mating with the user's hand to provide ease of manipulation of the buttons, tilting of the assembly to any orientation, and attachment to the computer. The ball housing member 123 is a separate member removably coupled to the upper housing 90. The particular ball housing member 123 is selected based upon a desired ball size 14 and the amount of surface area to be exposed. In one embodiment, the ball housing member 123 has a recessed surface to place the ball contact member 125 just above the center line 120 to permit a greater surface area of the ball to be exposed. If a different size ball 14 is used, such as a smaller ball, the housing 90 may remain unchanged and a new housing member 123 may be attached therein, having a smaller diameter hole, for mating with the size of the selected ball 14. If desired, the housing member 123 may be generally flat, or even have a convex surface if desired, although this is generally not preferred.

Figure 33:
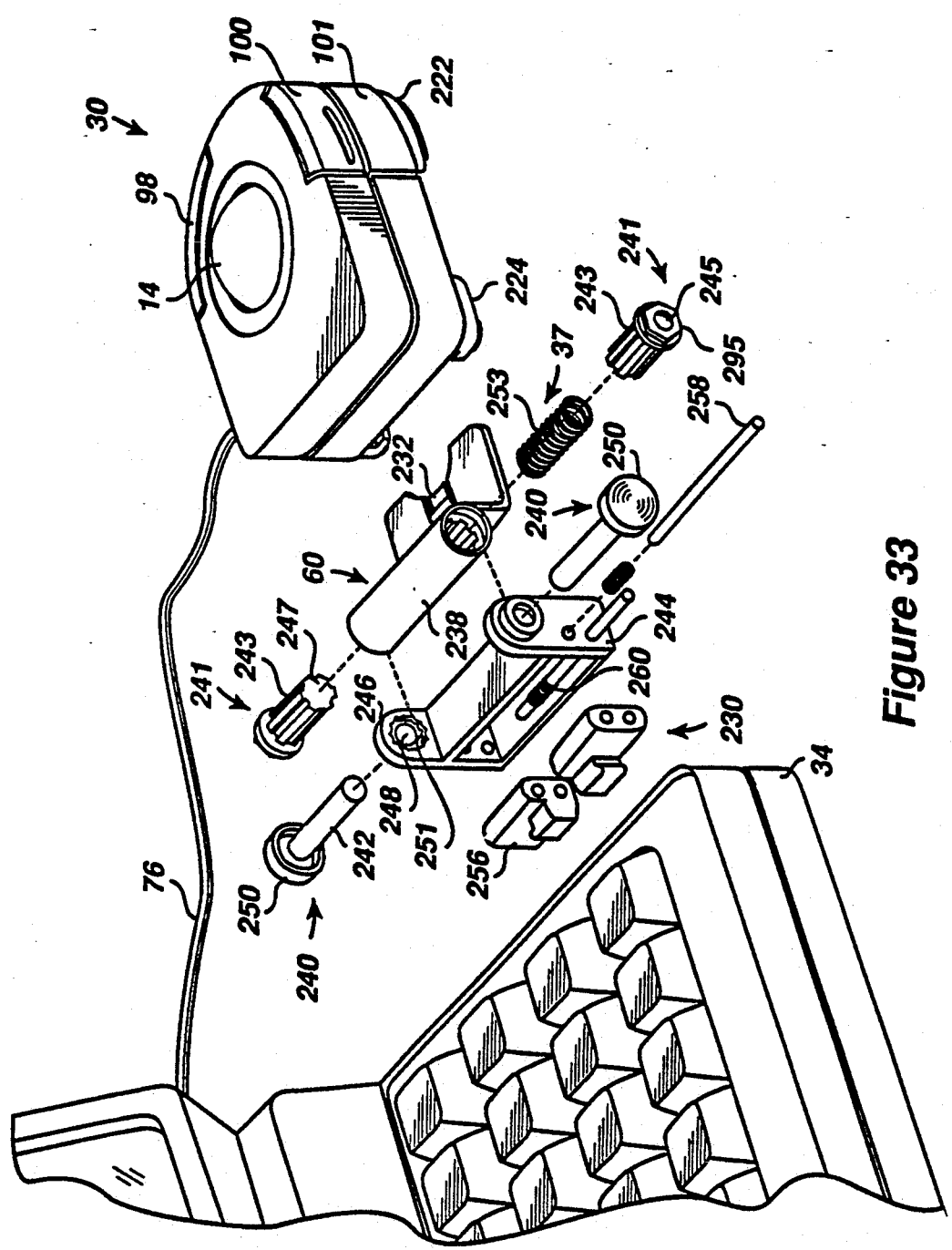
FIG. 33 is an exploded, isometric view of a pointing device, attaching assembly, and computer.
Figure 34:
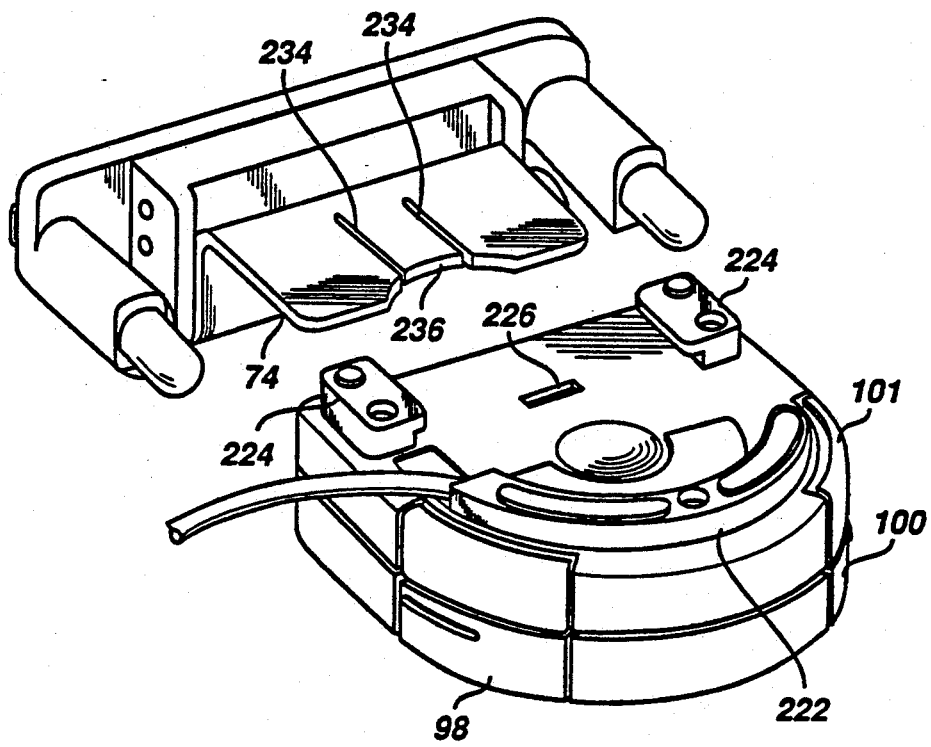
FIG. 34 is a bottom, exploded isometric view of a pointing device and attaching assembly of FIG. 33.
Figure 35:
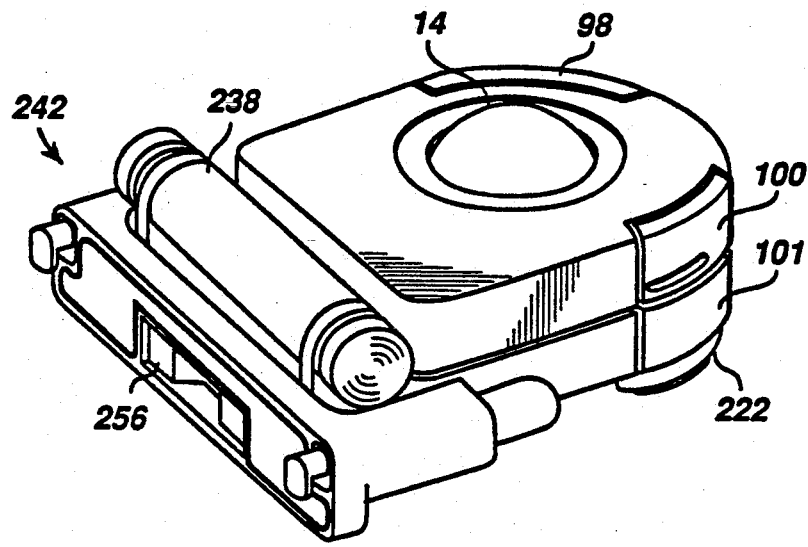
FIG. 35 is an isometric view of the pointing device of FIG. 34, coupled to the attaching assembly having a clamping assembly.
Figure 36:
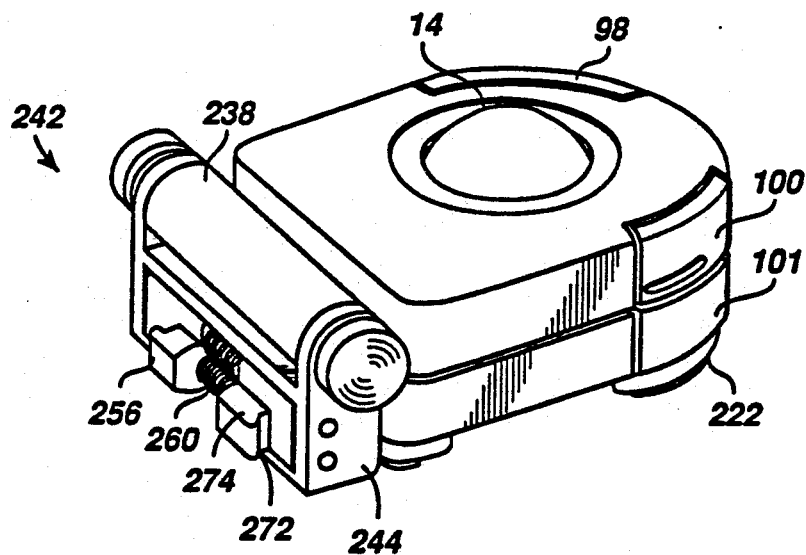
FIG. 36 is an isometric view of a pointing device coupled to an attaching assembly, without a clamping assembly.
Figure 37:
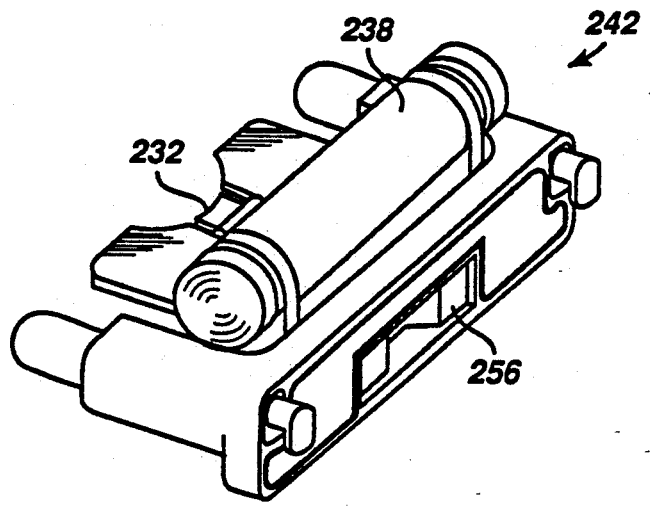
FIG. 37 is an isometric view of an attaching assembly with a clamping assembly.

FIG. 33 is an exploded view of the attachment assembly 32 coupling the pointing device 30 to the computer 34. The attachment assembly 32 includes a tilting assembly 37 and a coupling assembly 230 and, alternatively, a clamping assembly 35. The pointing device 30 is coupled to the tilting assembly 37 and the tilting assembly 37 is coupled to the computer via coupling assembly 230. The tilting assembly 37 includes a mounting plate 74 configured to mate with members 224. A protrusion 232 in the mounting plate 74 snaps into recess 226 to firmly retain the pointing device 30 on the mounting plate 74. The protrusion 232 is resiliently mounted on the mounting plate 74 to permit the pointing device 30 to easily slide on or off the mounting plate 74 if pulled straight backward, away from the attachment assembly 32. In the embodiment of FIG. 34, the protrusion 232 is resiliently biased by placing two slots 234 on either side thereof in the unitary mounting plate 74 to permit the tongue 236 to which the protrusion 232 is coupled to be slightly depressed to remove the protrusion 232 from the slot 226. Other techniques for releasably coupling the pointing device 30 to the mounting plate 74 may also be used.

Figure 38A:
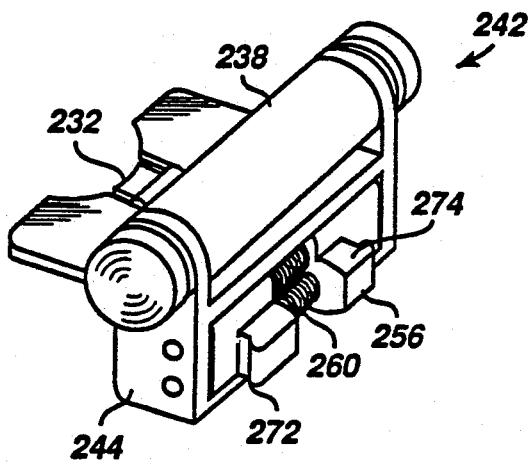
FIG. 38a is an isometric view of an attaching assembly, without a clamping assembly.
Figure 38B:
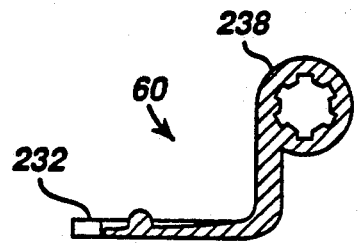
FIG. 38b is a cross-sectional view of a tilting assembly.
Figure 39:
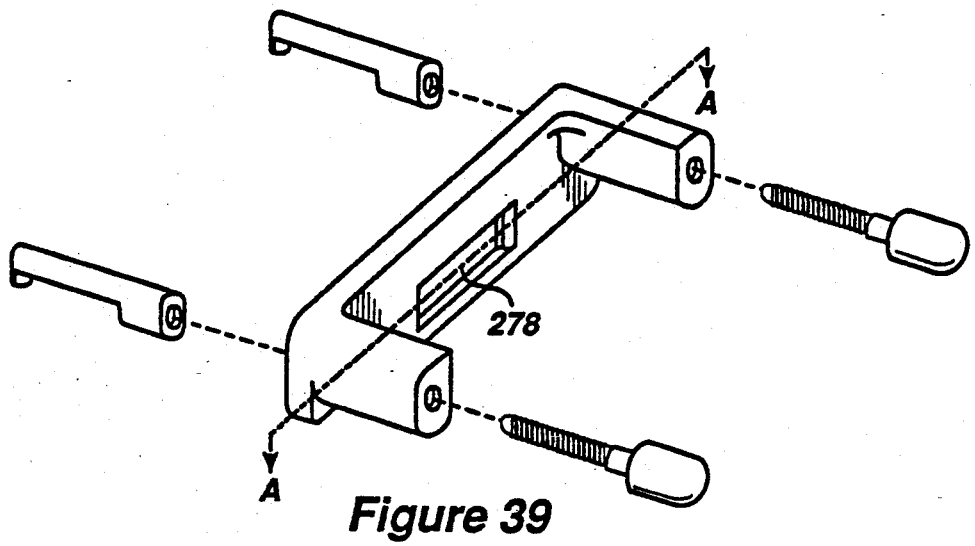
FIG. 39 is an exploded, isometric view of a clamping assembly.
Figure 40:
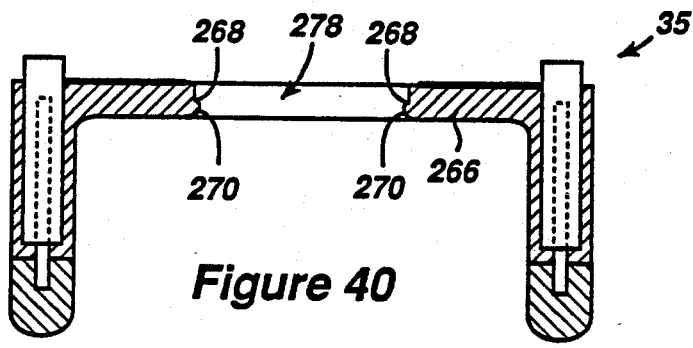
FIG. 40 is a cross-sectional view of the assembly of FIG. 39 taken along lines A—A.

As illustrated in FIG. 33, the tilting member 60 includes a tubing 238 having recesses in each end. A locking member 241 having a shaft portion 243, a recess 245, an end 247, and a head portion 295 is positioned inside tubing 238. The recesses in each end of tubing 238 include ridges and grooves for mating with the ridges and grooves locking member 241, see FIG. 38b, illustrating the ridges and grooves of tube 238. The ridges and grooves of shaft portion 243 mate with the respective grooves and ridges of tubing 238 to firmly retain the pivoting member 60 in the coupling assembly 230.

The coupling assembly 230 includes a coupling housing 244 to facilitate rotation of the tilting member 60 and also provide coupling to the computer 34. The upper part of coupling housing 244 includes tabs 246 having respective apertures 248 and recesses 251. An actuator 240 having a rod 242 and a head 250 is positioned in the locking member 241 and housing 244. The rod 242 extends through the aperture 248 and into recess 245, adjacent the end 247 of locking member 241. The spring 253 biases the locking members 241 outward, forcing the heads 295 into retaining contact with recesses 251 of tabs 246. The walls of recess 251 abut against the head 295, to firmly retain locking member 241 in a rigid position. In this state, the tilting member is locked in position and cannot change position or orientation. The ridges on shaft 243, together with head 295 locked into recess 251, retain the tilting member 60 in position.

If a user desires to change the orientation of the pointing device while it is rigidly attached to the computer, he does so by rotating the tilting member 60. To rotate the tilting member 60, the user depresses the two actuators 240 by simultaneously pressing on both buttons 250. Pressing on the buttons 250 causes the rod 242 to be pushed into abutting contact with the rear wall 247 of locking members 241. This action depresses the locking members 241 farther into the tube 238, compressing the spring 253 farther and moving the heads 295 out of engaging contact with the locking recesses 251. The locking member 241, and hence the shaft 238 and tilting member 60 can now freely rotate with respect to the coupling housing 230. The user rotates the pointing device to a selected orientation while holding buttons 250 depressed. The tilting member 60 and pointing device 30 coupled to it can be rotated to be in any selected position, including vertical, upside down or any position therebetween. The tilting member can freely rotate through an entire range of motion, the limitation being when the tilting member abuts the coupling housing 244.

The user may lock the pointing device 30 in any selected position or orientation. When the pointing device is in the desired orientation, the user releases the buttons 250, letting them move outward from the tube 238. The spring 253 forces the locking members 241 outward because rod 241 is no longer depressing them into the tube 238. The heads 295 lock into the housing 244 by contacting the recess 251, firmly retaining the locking member in a single, fixed orientation. The pointing device is now firmly held in the user's selected orientation and remains so positioned until the user elects to change the orientation again by depressing the buttons 250 on actuators 240.

The number of allowable locking positions depends upon the shape and number of sides in the recess 251 and head 295. In the embodiment shown, the head 295 of locking member 241 has six sides and the recess 251 has 12 sides; thus the locking member 241 can lock in numerous different positions, each separated by 30°. The number and location of sides can be selected to permit the tilting member to be positioned at any desired angle, with a selected separation between angles. For example, the head 295 or recess 251 could be square, or have 8, 10, 20 or any number of different sides. The number and position of different sides determines the number and angle of possible locking positions for the tilting member 60.

Coupling housing 244 includes a pair of gripping members 256. The gripping members 256 are retained in the coupling housing 244 by a pair of rods 258 extending through the coupling housing 244 and gripping members 256. A spring member 260 is positioned between the gripping members 256, resiliently biasing them outward. In the embodiment shown, the spring member 260 is two separate springs, one on each respective rod 258; however, a single spring or different resiliently biasing member may be used for spring member 260. The gripping members 256 directly coupled into the computer 34.

Figure 41:
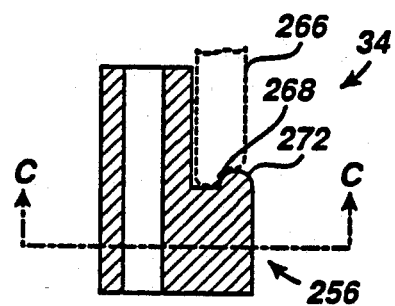
FIG. 41 is a cross-sectional view of a gripping member taken along lines B—B of FIG. 42.
Figure 44A:
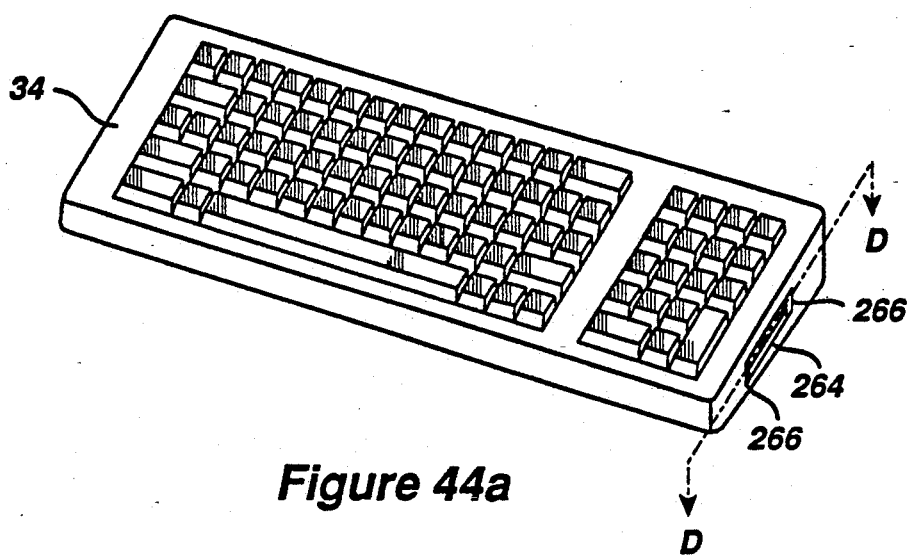
FIG. 44a is an isometric view of a computer having a recess for receiving the attaching assembly of FIG. 44b is a cross-sectional view of FIG. 44 taken along lines D—D.
Figure 44B:
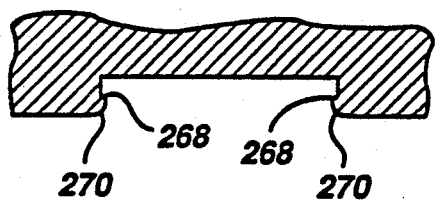

As shown in FIG. 44a, computer 34 includes a recess 264. The recess 264 includes a pair of flanges 266 for mating with the gripping members 256. The flanges 266 include a retaining region and an arcuate region. FIG. 44b is a cross-sectional view along lines D—D of FIG. 44a, illustrating the interior of recess 264. Each flange 266 includes a retaining region 268 and an arcuate region 270. The gripping members extend into the recess 264 in contact with the retaining region 268, as shown in FIG. 41. The full weight of the attachment assembly and pointing device is supported by the gripping members 256, to retain the pointing device on the computer in a fixed location. The spring 260 forces the gripping members 256 outward, into abutting contact with the retaining region 268 of flanges 266. The pointing device 30 is solidly connected to the computer 34 via the coupling assembly gripping members, in contact with the flange 266.

The pointing device 30 is releasable from the computer 34 if sufficient force is supplied to separate the two. The gripping member 256 is biased into retaining contact with the flange 266 by spring 260. Spring 260 is sufficiently strong to firmly hold the gripping members outward, in solid retaining contact with the flange 266. If the pointing device is impacted with excessive force, the spring 260 is compressed, permitting the gripping member 256 to separate from the flange 266 and pointing device to separate from the computer 34.

Figure 42:
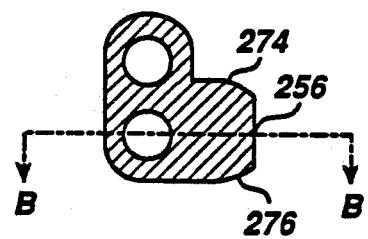
FIG. 42 is a cross-sectional view of the gripping member taken along lines C—C of FIG. 41.
Figure 43:
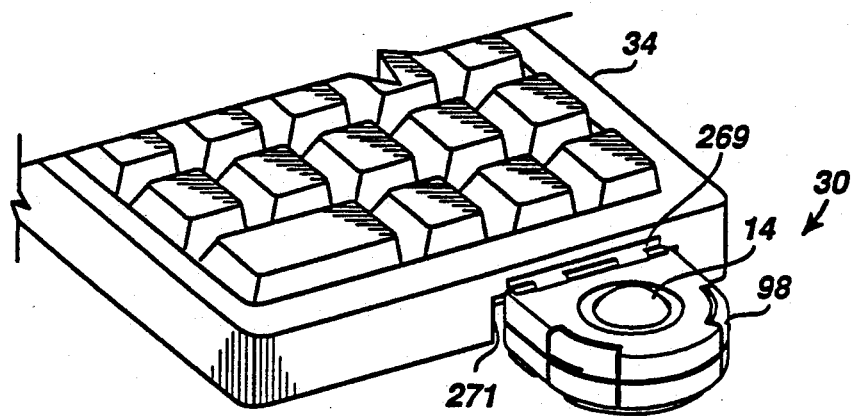
FIG. 43 is an isometric view of an alternative embodiment of an attaching assembly for attaching a pointing device to a computer.

The gripping members 256 are configured to permit easy release of the pointing device 30 in many different directions. As illustrated in FIGS. 42 and 43, the gripping member includes a protrusion 272 for mating with the flange 266. The protrusion 272 is rounded. If the force is applied to the pointing device 30 in a direction which pulls the gripping member 256 out of the recess 264, the protrusion 272 will abut the retaining portion 268 of flange 266 to retain the coupling assembly 37 in connection with computer 34. However, if the force applied is excessive force, that is, sufficient force that the pointing device or the computer may be broken by the force, this force is applied to protrusion 272 on flange 266. As the force increases, the protrusion 272 will be pushed up over retaining region 268, the protrusion 272 being somewhat rounded. The force of spring 260 is overcome, permitting the gripping member 256 to move inward, over retaining region 268 and onto the arcuate region 270. The protrusion 272 rides smoothly over the arcuate region 270, because both are arcuate, and easily separates in a single smooth motion. The protrusion 272 is thus forced over the flange 266 and the gripping members 256 are released from the computer 34, causing separation of the pointing device 30 from the computer 34. As the protrusion 272 extends over the region 270, the spring 260 continues to bias the gripping member 256 outward. The gripping member 256 is still forced outward by the spring 260, pushing the protrusion 272 in contact with the backside of arcuate portion 270, which acts as a separation force, pushing the gripping member away from the computer 34.

The force which is determined as excessive force, that is, the force sufficient to separate the pointing device from the computer, is selectable by varying a number of different parameters. The force required for separation is selected as that force which is less than that required to break the housing of the computer, the keyboard, or the pointing device, if they are impacted by such a force. The shape or height of flange 266 is selectable to permit relatively easy, or alternatively, relatively hard separation of the gripping member 256 from the computer 34. Similarly, the shape of protrusion 272 is selectable, whether arcuate, flat, or some other shape, to provide a desired resistance to separation from computer 34. The strength of spring 260 is selected to provide the desired force to retain the gripping members 256 in solid contact with computer 34, but being depressible by a force somewhat less than that required to break the pointing device or computer 34.

A person of skill in the art could vary the design of the flange 266, protrusion 272, gripping member 256, and strength of spring 260, to select the separation force at any desired value. Preferably, that force will be sufficiently great that the pointing device 30 remains firmly coupled to the computer 34 during normal operation and use, but, if sufficient force is applied that the computer or housing would be broken, will permit them to separate from each other rather than being broken.

For example, in FIG. 32, the clamps are coupled to a thin ridge 350 at the edge of the computer keyboard. If excessive force is applied to the clamp blades 36, the ridge 350 will be broken. If the necessary separation force is great, the ridge may be broken; but if the shape of the gripping members 256 or flange 266 is selected, for extremely easy release, the pointing device 30 will separate from the computer before the ridge 350 is broken, leaving the clamp intact on the ridge 350.

The just-described easy release mechanism may also be used as the method a user elects to always remove the pointing device 30 from the computer. As previously described, the pointing device 30 is coupled to the computer via the mounted fitting member 60. The user may remove the pointing device 30 from the tilting assembly and leave the tilting assembly coupled to the computer. Alternatively, and usually preferred for compact computer storage, the user will remove the entire coupling assembly from the computer by pulling it off, using the easy-release mounting. The pointing device 30 is thus removed from the computer while coupled to the tilting assembly. The easy-release mechanism thus provides for convenient attachment and release of the pointing device, besides being a safety device.

As illustrated in FIGS. 41 and 42, the gripping members 256 are shaped to permit easy separation if a force is applied directly upward or downward on the pointing device relative to the computer. The gripping members include arcuate surfaces 274 and 276 on the upper and lower surfaces, respectively, of the gripping member 256. If the pointing device 30 is struck from the top, the force being applied downward, the arcuate surface 274 permits the gripping member 256 to rotate outward, away from the computer as the protrusion 272 extends over the flange 266 to separate from the computer 34. Similarly, the arcuate surface 276 permits the gripping member 256 to separate from the computer 34 if the pointing device is struck from the undersurface and forced upward. The gripping members 256 are thus configured to release from the computer 34 when excessive force is applied in any direction, whether up, down, left, right, or any combination thereof.

Figure 45:
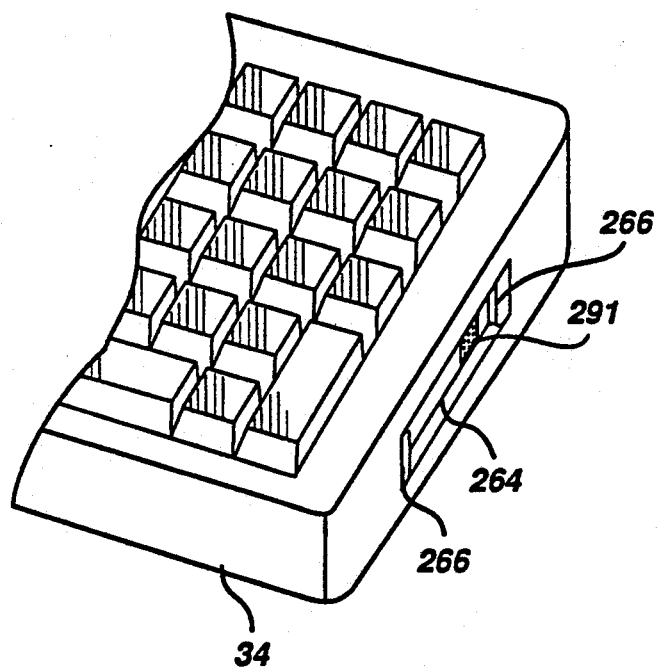
FIG. 45 is an isometric view of a recess in a computer having an electrical socket.

In an alternative embodiment, shown in FIG. 45, the computer includes, either in recess 276 or adjacent thereto, an electrical socket 291 for receiving an electrical coupling from the pointing device. The pointing device includes an electrical connection (not shown) configured to plug directly into the computer socket 291, through the attaching assembly. The electrical connection also provides mechanical support for the pointing device. In the other alternative embodiment, the pointing device is coupled to the computer by an electrical cable that provides no mechanical support, similar to that provided in the prior art.

Some computers 34 will not include a mating recess 264 specially designed for receiving the gripping members 256. For computers not having a mating recess 276, a clamping assembly 35 is provided. The clamping assembly 35 includes a clamping means 36, either a unitary, single blade member or a pair of separate clamping members 36a and 36b, similar to that shown in FIG. 6. The clamping assembly 35, as shown in the embodiment of FIGS. 35–44, is similar to that shown and described with respect to FIG. 6 of the alternative embodiment, except that an aperture 278 is providing for receiving the gripping members 256. The configuration and size of aperture 278 is similar to that of the configuration and size of recess 264 in computer 34. The aperture 278 includes flanges 266 having respective retaining regions 268 and arcuate regions 270. The gripping members 256 are releasably coupled into the aperture 278 in a manner similar to that previously described with respect to their coupling into recess 264 of computer 34.

The pointing device 30 is releasably coupled to the clamping assembly 35 in the fashion previously described with respect to FIGS. 33 and 41–44a. The clamping assembly 35 is rigidly coupled to the computer 34 as shown in FIG. 44. The coupling assembly 230 is connected to the clamping assembly 35 in the manner previously described. If excessive force is applied to the pointing device 30, such as that force which would cause the clamp bar 36 to break the computer 34, the gripping members 256 will release from the clamping assembly 35 prior to the computer 34 or the pointing device being broken.

In one embodiment, the computer 34 will include a recess 264 for mating with the coupling assembly 230. However, some computer models, particularly older models currently in use, do not include a mating recess 264 for receiving the coupling assembly 230. A clamping assembly 35 is therefore provided for attachment to such computers. The clamping assembly may be of a type similar to that shown and described with respect to FIG. 6.

FIG. 43 illustrates an alternative method of attaching the pointing device 30 to a computer 34. The pointing device is directly coupled to the computer 34 by hinge 269. In this embodiment, the pointing device 30 is always coupled to the computer. The pointing device is stowed in the computer, generally out of the way when stowed, such as in recess 271, to permit the computer to be portable. When using the pointing device, the user removes the pointing device 30 from the recess 271 by lifting it upward and outward, changing its orientation with respect to the computer, and placing it in a desired orientation for use. The hinge 269 may include a release mechanism similar to those previously described to permit it to be easily removed by the user, but this is not required. The hinge includes an attaching assembly, similar to those described in more detail herein, to permit the user to select the vertical orientation of the pointing device 30. The user is thus able to select and vary the vertical orientation of the pointing device 30 in this embodiment, just as in the other embodiments, to facilitate convenient use or permit it to be stowed in the computer.

The pointing device may be stored in recess 271 in a number of different orientations. For example, it may be positioned under the computer 34 and flipped out. It may be positioned on top of the computer 34 and flipped up. It may be positioned inside, on top of or under the computer and slide out, undergoing generally horizontal motion to place it in position and then be positionable by a user to a desired vertical orientation.

Figure 46:
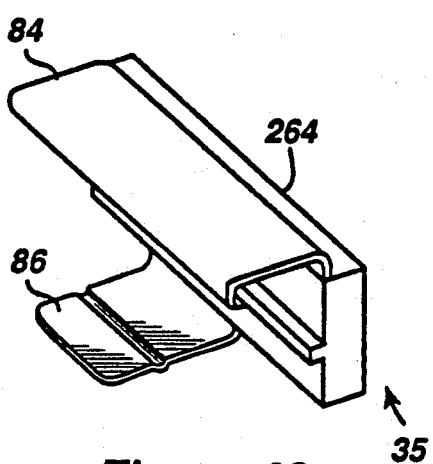
FIG. 46 is an isometric view of an alternative embodiment of a clamping device.
Figure 47:
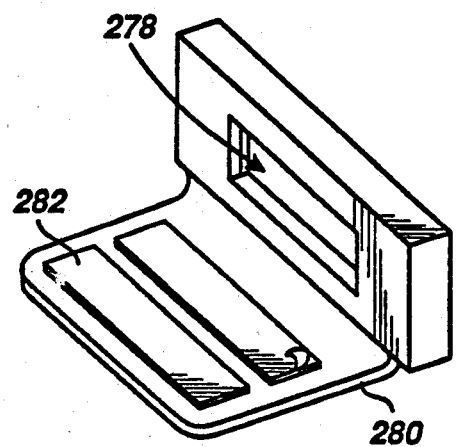
FIG. 47 is an isometric view of an alternative embodiment of a clamping device.
Figure 48:
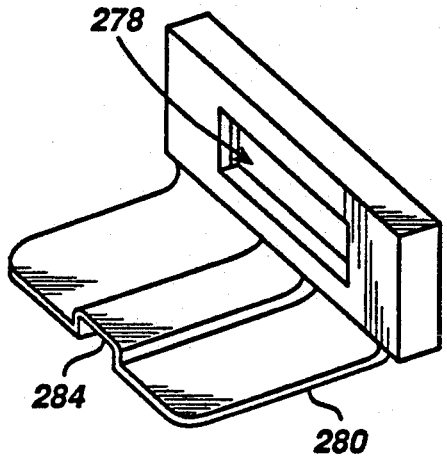
FIG. 48 is an isometric view of an alternative embodiment of a clamping device.
Figure 49:
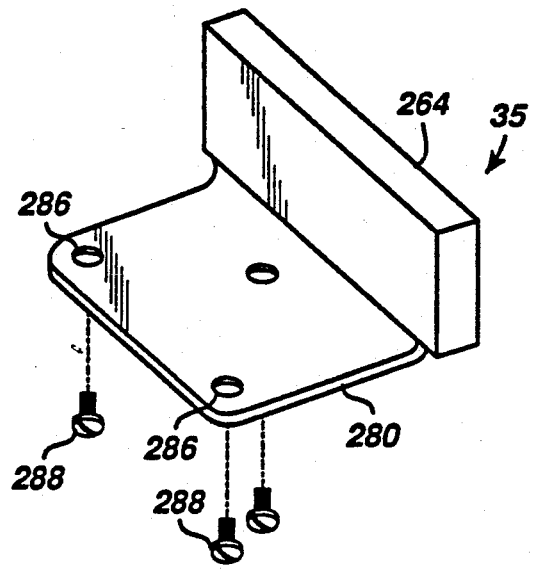
FIG. 49 is an isometric view of an alternative embodiment of a clamping device.
Figure 50:
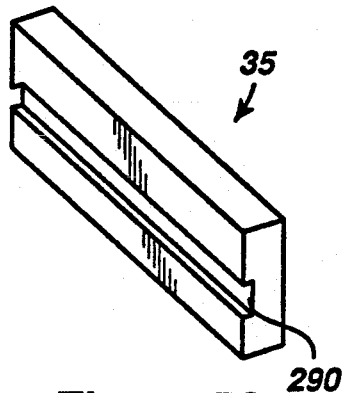
FIG. 50 is an isometric view of an alternative embodiment of a clamping device.

FIG. 46-50 illustrate alternative embodiments of clamping assemblies for attaching the coupling assembly to the computer 34. As illustrated in FIG. 46, the clamping assembly may include a C-shaped clamping member having an upper flange 84 and a lower flange 86 for clipping the clamping assembly to the keyboard. Alternatively, the clamping assembly 35 may include a lower flange 280 having adhesive members 282 thereon for adhesively attaching the clamping member 35 to the computer 34. The user may attach the clamping member 35 at any desired location by removing the protective layer from adhesive strips 282 and sticking the clamping member 35 to the computer, such adhesive strips being well known in the art. Alternatively, as illustrated in FIG. 48, the lower flange 280 may include a mating dovetail slot 284 for coupling to a particular part of a computer. Alternatively, as illustrated in FIG. 49, the lower flange 280 may include apertures 286 through which threaded fasteners 288 may extend for threadably coupling the clamping member 35 to the computer 34. Alternatively, the clamping member 35 may include a horizontally extending dovetail slot 290 for coupling to a mating flange on a computer or other computer peripheral. Each of the clamping assemblies 35 may be configured for coupling to a computer peripheral device adjacent to the computer or attached thereto rather than to the computer itself if desired. FIG. 51 illustrates an embodiment similar to that of FIG. 43, except that a tilting assembly 60 having buttons 250, constructed as described with respect to FIG. 33, is provided to permit the user a wider variation of selectable positions for the orientation of the pointing device 30.

Figure 53:
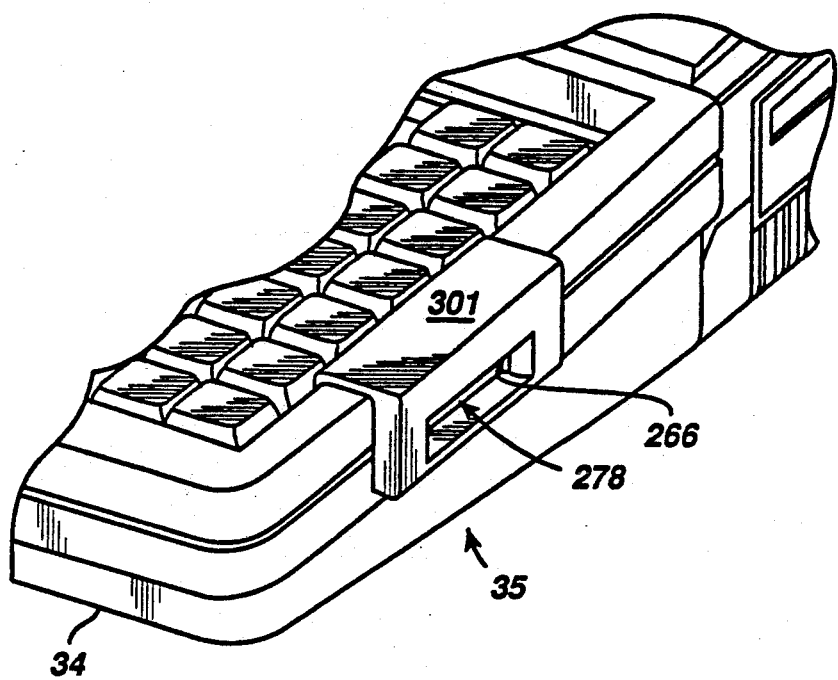
FIG. 53 is an isometric view of the clamping assembly of FIG. 52 coupled to a computer.

FIGS. 52A, 52B and 53 illustrate alternative clamping assemblies 35 for coupling the pointing device 30 to the computer 34. The clamping assembly includes a retaining member 301 for fitting onto the side of the keyboard, as shown in FIG. 53. The width of 301 is selected to mate with the configuration of a particular computer. In the embodiment of FIG. 52A, body portion 303 includes an aperture 278 having a flange 266 which operates in a manner previously described. In the embodiment of FIG. 52B, rubber pads 267 are coupled to the body 303 to provide the contact surface with the side of the keyboard. The rubber will not mar the keyboard and serves to dampen any vibration or absorb small movements of the pointing device with respect to the keyboard.

Figure 54:
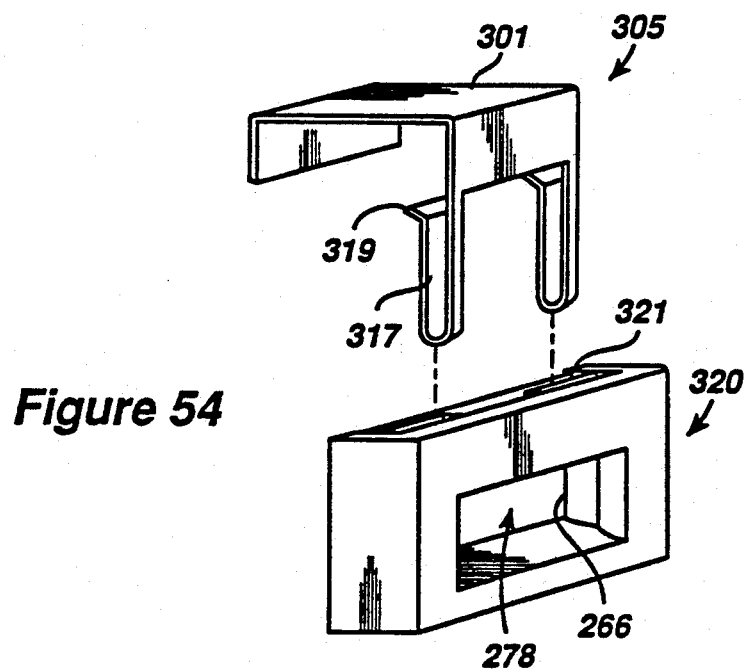
FIG. 54 is an isometric view of an alternative embodiment of a clamping assembly.

FIG. 54 illustrates a two-part clamp assembly 35 having a body member 320 and a coupling member 305. The coupling member 305 includes a retaining member 301 whose width is selected to mate with a particular computer. Coupling arms 317 extend into recess 321 of body member 320 to form a unitary clamping assembly. Flanges 319 on arms 317 releasably lock inside the aperture 321 to permit a different coupling member having a different width retaining member 301 to be combined with the same body member 310. The user may thus select that coupling member 305 which best mates with his computer to provide a solid fit, while using a standard body member 320.

Figure 55:
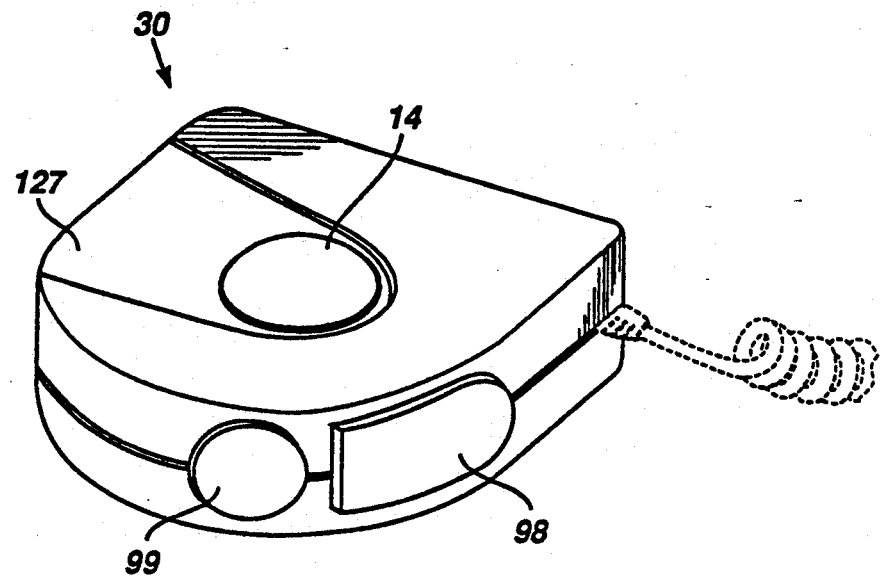
FIG. 55 is a front isometric view of a further alternative embodiment of a pointing device.
Figure 56:
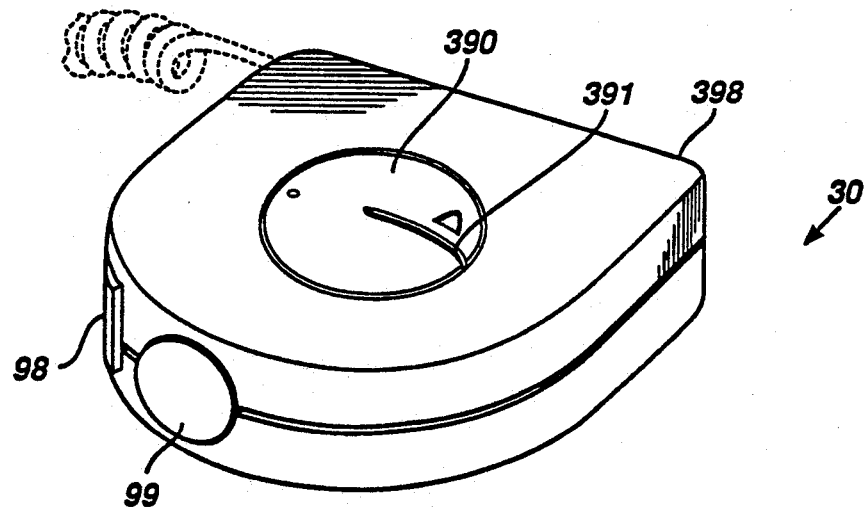
FIG. 56 is a front, underside, isometric view of the device of FIG. 55.

FIGS. 55–60 illustrate an alternative embodiment of a pointing device 30 and attachment assembly 32. FIG. 55 is a top side view. FIG. 56 is an underside view. A rotatable cover plate and switch 390 having a ridge 391 permits a user to configure the pointing device for left or right side use, other features, facilities or permits removal of the ball. For example, the position of the switch selects one of the buttons as the primary button, varies the speed of the cursor, or activates the ball 14 as a switch. The cover of switch 390 can also be removed by rotating it to a selected position to permit removal of the ball 14 for cleaning.

In this embodiment, one button 98 extends circumferentially along the outer surface of the housing and a second button 99 is a round button positioned on the arcuate region of the housing 91. The upper housing 90 includes a recess 127 to expose a greater portion of the ball 14 to provide a larger surface area for manipulation by a user.

The pointing device is coupled to the attachment assembly 32 with a dovetail mount. The rear surface 398 of the pointing device 30 includes a recess 400 having a dovetail slot 402 for receiving the attachment assembly 32. The dovetail mount of the attachment assembly 32 is placed into the large recess 400 and slid into dovetail slot 402 to lock onto the pointing device.

The attachment assembly 32 is coupled to the computer by any suitable means, such as those previously discussed. Alternatively, the double-sided tape or an adhesive foam is on the attachment assembly 32 to permit it to be removably coupled to the computer. A two-sided adhesive that is reusable is preferred. The pointing device easily separates from the computer with a minimum force. If the pointing device is struck, it will be released at the two-sided adhesive contact rather than break.

Figure 57:
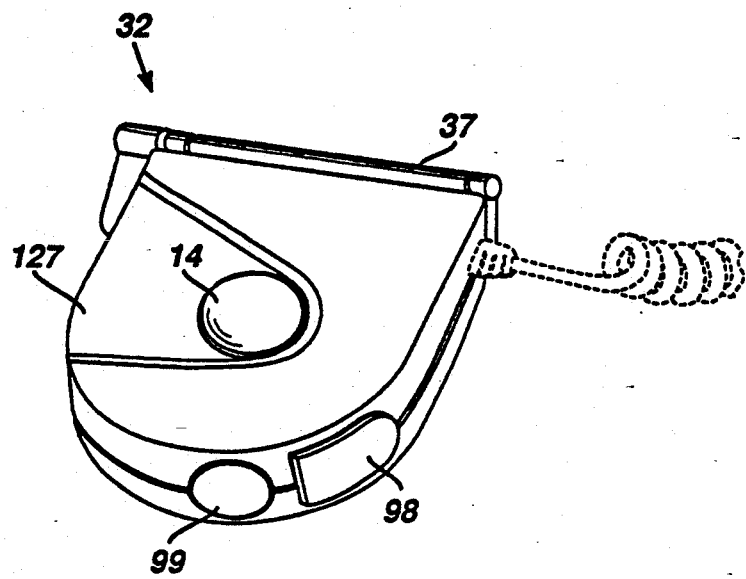
FIG. 57 is a top, isometric view of the pointing device of FIG. 55 with an attachment assembly and tilting assembly.
Figure 58:
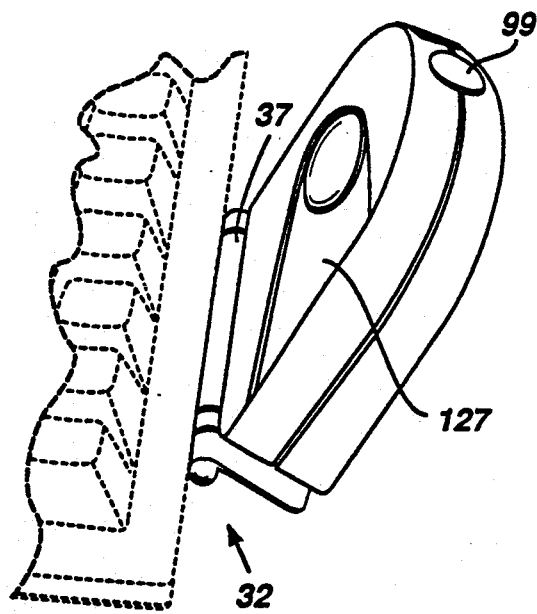
FIG. 58 is an isometric view of the device of FIG. 57 coupled to a computer and tilted with respect to the horizontal.
Figures 59, 60:
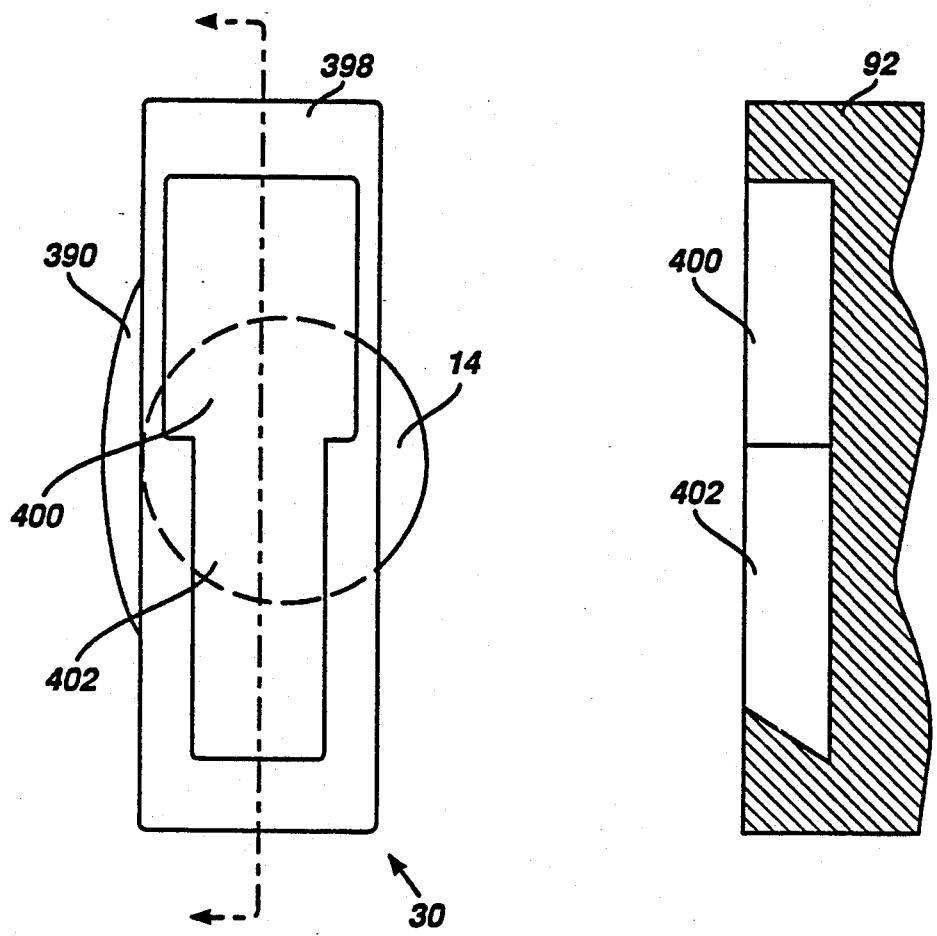
FIG. 59 is a rear elevational view of the alternative pointing device of FIG. 55 showing a recess for receiving a coupling assembly.
FIG. 60 is a cross-sectional view taken along lines 60—60 of FIG. 59 illustrating the slot and recess for receiving a coupling assembly.

FIGS. 57 and 58 illustrate an alternative embodiment of an attachment assembly 32 including a tilting assembly 37 and coupling assembly 230. The tilting assembly 37 permits the pointing device 30 to be positioned at any selected angle.

A plurality of different embodiments for the pointing device 30, attachment assembly 32, button support member 132 and the like, have been shown and described. Each of the different embodiments may be used in combination with the other embodiments shown herein. While not illustrated, the pointing device 30 is a joy stick in one embodiment of the invention. Other computer input devices may be substituted for the pointing device 30, if desired. Any combination or subcombination that operates on the same principles of this invention to perform the same function, falls within the scope of the invention.

We claim:

1. A computer command apparatus for entering commands into a computer resting on a support surface, the computer having a video display screen comprising:
- a housing mechanically attachable to the computer and having a top, a bottom, a first side positioned toward the computer when the housing is mechanically attached tot he computer, and an arcuate second side opposite said first side, said arcuate side extending in an arcuate shape;
- a pointing device within said housing, said pointing device including a rotatable ball and encoding shafts and being adapted to generate electrical signals translatable into commands to position a cursor on said screen, the rotatable ball projecting above said top and positioned in a central region of said top at a distance from said housing arcuate side to allow rotation by the thumb alone of a user while the user's finger of the same hand extends circumferentially along said arcuate side;
- a first button coupled to said housing at said housing arcuate side, said first button having an elongated arcuate side surface extending circumferentially along said housing arcuate side and having generally the same radius of curvature as said housing arcuate side to provide a smooth, matching contour between said housing and said button, said first button being adapted to generate electrical signals translatable into commands for said computer when depressed, and being positioned for contact and depression by the user's finger when the finger extends circumferentially along said housing arcuate side and the user's thumb is concurrently positioned on said ball for rotation with the thumb; and
- an attaching member selectively attachable and detachable to the computer, said attaching member supporting the entire weight of said housing at a position above and out of contact with the support surface when the computer is resting on the support surface.

2. The apparatus according to claim 1 wherein said housing's and said button's respective arcuate sides are concentrically arranged.

3. The apparatus according to claim 1, further including a second button coupled to said housing, said second button being positioned directly below said first button and extending coextensive with said first button.

4. The apparatus according to claim 1 wherein said housing top includes a recessed region immediately surrounding said ball to expose a large surface area of said ball.

5. The apparatus according to claim 4 wherein said housing top includes a ball housing member coupled thereto, said recessed region being formed in said ball housing member.

6. A computer and pointing device combination comprising:
- a computer having a screen housing and a keyboard housing coupled to each other, said keyboard housing being usable while resting on a support surface;
- an attaching member selectively attachable and detachable to said keyboard housing, said keyboard housing supporting the entire weight of said attaching member and holding said attaching member above and out of contact with the support surface when said keyboard housing is resting on the support surface;
- a pointing device mechanically connected to said attaching member, said attaching member supporting the entire weight of said pointing device and holding said pointing device above and out of contact with the support surface when said keyboard housing is resting on the support surface, whereby said pointing device is usable without being directly supported by the support surface; and
- adjustment means for permitting a user to adjustably vary the angular orientation of said pointing device with respect to said keyboard housing and to lock said pointing device at a selected angular orientation so that said pointing device is fixed at said selected angular orientation when force is applied to said pointing device by a user during normal usage.

7. The combination according to claim 6 wherein said attaching member includes a manually operable coupling means for releasably attaching said attaching member to said keyboard housing to permit said pointing device to be selectively detached from said keyboard housing.

8. The combination according to claim 6 wherein said keyboard housing includes a recess which is adapted to mechanically retain said attaching member to said keyboard housing.

9. The combination according to claim 6 wherein said attaching member includes an attaching means for permitting said pointing device to detach from said keyboard housing upon the application of a predetermined force to said pointing device without damaging said keyboard housing or said pointing device during separation.

10. The combination according to claim 9 wherein said attaching means includes a gripping member attachable to said keyboard housing, said gripping member being resiliently biased into a locking position to attach said attaching member to said keyboard housing, said gripping member being movable into a release position for detachment of said attaching member from said keyboard housing upon the application of said force to said pointing device.

11. The combination according to claim 6 wherein said attaching member includes a clamp attachable to a perimeter position of said keyboard housing.

12. A computer having means for mechanically retaining a pointing device connected to the computer, the pointing device having a connector portion, comprising:
- a computer keyboard housing member;
- a recess in said computer keyboard housing member defined by a pair of opposing side walls; and
- a pair of transverse flanges extending toward each other form said side walls and into said recess, said flanges each terminating in a free end portion, said end portion being spaced apart to define a narrowed opening therebetween within said recess sized to receive the connector portion, said flanges having an inwardly facing surface contacting and retaining the connector portion when the pointing device is connected to the computer to retain the connector portion within said recess and mechanically connect the pointing device to the computer.

13. The computer according to claim 12 wherein said recess includes an electrical connection member positioned within said recess between said side walls.

14. The computer according to claim 12 wherein said recess includes a back wall and said flanges include a retaining region facing the back wall of said recess to provide a firm surface for retaining the connector portion and mechanically connecting the pointing device to the computer, the full weight of the pointing device being supported by the computer.

15. A computer having means for mechanically retaining a pointing device connected to said computer, the pointing device having a connector portion, comprising:

a computer housing member;

a recess in said computer housing member defined by a pair of opposing side walls; and a pair of transverse flanges extending toward each other from said side walls and into said recess, said flanges each terminating in a free end portion, said end portions being spaced apart to define a narrowed opening therebetween within said recess designed to receive the connector portion, said flanges having an inwardly facing surface contacting and retaining the connector portion when the pointing device is connected to the computer to retain the connector portion within said recess and mechanically couple the pointing device to the computer.

16. The computer according to claim 15 wherein said recess includes an electrical connection member positioned within said recess between said side walls.

* * * * *

UNITED STATES PATENT AND TRADEMARK OFFICE
CERTIFICATE OF CORRECTION

PATENT NO. : 5,281,958
DATED : January 25, 1994
INVENTOR(S) : Stuart Ashmun et al.

It is certified that error appears in the above-identified patent and that said Letters Patent is hereby corrected as shown below:

In column 25, claim 1, line 7, please delete "tot he" and substitute therefor --to the--.

In column 26, claim 12, line 53, please delete "form" and substitute therefor --from--.

Signed and Sealed this

Thirtieth Day of August, 1994

Attest:

BRUCE LEHMAN

Attesting Officer

Commissioner of Patents and Trademarks